(12) United States Patent
De Patre et al.

(10) Patent No.: US 7,362,974 B2
(45) Date of Patent: Apr. 22, 2008

(54) METHOD FOR PLANNING OR PROVISIONING DATA TRANSPORT NETWORKS

(75) Inventors: Simone De Patre, Bregnano (IT);
Guido Alberto Maier, Milan (IT);
Achille Pattavina, Milan (IT)

(73) Assignee: Pirelli & C. S.p.A., Milan (IT)

( * ) Notice: Subject to any disclaimer, the term of this patent is extended or adjusted under 35 U.S.C. 154(b) by 492 days.

(21) Appl. No.: 10/497,008

(22) PCT Filed: Nov. 21, 2002

(86) PCT No.: PCT/EP02/13071

§ 371 (c)(1),
(2), (4) Date: Oct. 20, 2004

(87) PCT Pub. No.: WO03/047144

PCT Pub. Date: Jun. 5, 2003

(65) Prior Publication Data

US 2005/0069314 A1 Mar. 31, 2005

Related U.S. Application Data

(60) Provisional application No. 60/337,138, filed on Dec. 10, 2001.

(30) Foreign Application Priority Data

Nov. 30, 2001 (EP) .................................. 01128616

(51) Int. Cl.
*H04J 14/00* (2006.01)
*H04L 12/28* (2006.01)

(52) U.S. Cl. .............................. 398/50; 398/9; 398/34; 398/48; 370/217; 370/238; 370/408; 709/239

(58) Field of Classification Search ................... 398/3, 398/5, 9, 25, 42, 50, 57, 58; 370/238, 230, 370/235, 217, 221, 216, 251, 241, 248, 351, 370/408; 455/403; 701/209; 726/3; 716/18; 709/239
See application file for complete search history.

(56) References Cited

U.S. PATENT DOCUMENTS 6,047,331 A * 4/2000 Medard et al. ............. 709/239

(Continued)

OTHER PUBLICATIONS

Chen, C. et al., "A New Model for Optimal Routing and Wavelength Assignment in Wavelength Division Multiplexed Optical Networks[1]", Proceedings of IEEE INFOCOM 1996, Conference on Computer Communications, Fifteenth Annual Joint Conference of The IEEE Computer and Communications Societies, Networking The Next Generation, San Francisco, Proceedings of Infocom, L., vol. 2, Conf. 15, pp. 164-171, (Mar. 24, 1996).

(Continued)

*Primary Examiner*—Kenneth Vanderpuye
*Assistant Examiner*—Li Liu
(74) *Attorney, Agent, or Firm*—Finnegan, Henderson, Farabow, Garrett & Dunner, L.L.P.

(57) ABSTRACT

A tool for static or dynamic planning of a WDM network with dedicated protection. The WDM network is represented by a layered graph having image nodes for each node of the network and horizontal arcs for each link of the network, so as to replicate in each layer the topology of the network. A Bhandari algorithm is adapted for finding on the layered graph a working-spare pair of lightpaths for each connection request to be allocated.

15 Claims, 30 Drawing Sheets

U.S. PATENT DOCUMENTS

| | | | | |
|---|---|---|---|---|
| 6,122,283 | A | * | 9/2000 | Lee .......................... 370/408 |
| 6,304,349 | B1 | * | 10/2001 | Alanyali et al. ............... 398/9 |
| 6,728,205 | B1 | * | 4/2004 | Finn et al. .................. 370/217 |
| 6,882,627 | B2 | * | 4/2005 | Pieda et al. ................. 370/248 |
| 6,996,065 | B2 | * | 2/2006 | Kodialam et al. .......... 370/238 |
| 7,058,296 | B2 | * | 6/2006 | Saniee et al. .................. 398/3 |
| 7,075,892 | B2 | * | 7/2006 | Grover et al. .............. 370/238 |

OTHER PUBLICATIONS

Bhandari, R., "Optimal Physical Diversity Algorithms and Survivable Networks", Computers and Communications, 1997 Proceedings, Second IEEE Symposium on Alexandria, Egypt, Jul. 1-3, 1997, Los Alamitos, CA, USA, IEEE Comput. Soc., US, Jul. 1, 1997, pp. 433-441, (1997).

Garnot, M. et al., "Routing Strategies for Optical Paths in WDM Networks", Communications, 1997. ICC '97 Montreal, Towards Knowledge Millennium. 1997 IEEE International Conference on Montreal, Que., Canada, Jun. 8-12, 1997, New York, NY, USA, IEEE, US, Jun. 8, 1997, pp. 422-426, (1997).

Van Caenegem, B. et al., "Dimensionning of Survivable WDM Networks", IEEE Journal on Selected Areas in Communications, vol. 16, No. 7, pp. 1146-1157, (Sep. 1998).

Miyao, Y. et al., "Optimal Design and Evaluation of Survivable WDM Transport Networks", IEEE Journal on Selected Areas in Communications, vol. 16, No. 7, pp. 1190-1198, (Sep. 1998).

Maier, G. et al., "Static-Lightpath Design by Heuristic Methods in Multifiber WDM Networks", Proceedings of OptiComm 2000 SPIE Conf., Dallas, Oct. 2000, pp. 64-75, (2000).

Bhandari, R., "Survivable Networks—Algorithms for Diverse Routing; Shortest Path Algorithms", Kluwer Academic Publishers, 2.1 to 3.5.2, 72 pages, (1999).

* cited by examiner (PRIOR ART)

|    | 1 | 2 | 3 | 4 | 5 | 6 | 7 | 8 | 9 | 10 | 11 | 12 | 13 | 14 |
|----|---|---|---|---|---|---|---|---|---|----|----|----|----|----|
| 1  | - | 1 | 0 | 0 | 0 | 0 | 0 | 0 | 1 | 0  | 0  | 0  | 0  | 0  |
| 2  |   | - | 1 | 0 | 7 | 1 | 2 | 6 | 2 | 4  | 0  | 4  | 0  | 3  |
| 3  |   |   | - | 1 | 2 | 0 | 10| 21| 4 | 1  | 0  | 0  | 0  | 1  |
| 4  |   |   |   | - | 0 | 0 | 1 | 0 | 1 | 1  | 0  | 1  | 0  | 1  |
| 5  |   |   |   |   | - | 0 | 2 | 6 | 2 | 2  | 0  | 8  | 1  | 4  |
| 6  |   |   |   |   |   | - | 1 | 0 | 1 | 1  | 0  | 0  | 0  | 1  |
| 7  |   |   |   |   |   |   | - | 11| 3 | 2  | 0  | 7  | 0  | 3  |
| 8  |   |   |   |   |   |   |   | - | 6 | 6  | 1  | 5  | 1  | 3  |
| 9  |   |   |   |   |   |   |   |   | - | 4  | 1  | 13 | 2  | 0  |
| 10 |   |   |   |   |   |   |   |   |   | -  | 1  | 2  | 1  | 0  |
| 11 |   |   |   |   |   |   |   |   |   |    | -  | 1  | 0  | 0  |
| 12 |   |   |   |   |   |   |   |   |   |    |    | -  | 0  | 0  |
| 13 |   |   |   |   |   |   |   |   |   |    |    |    | -  | 1  |
| 14 |   |   |   |   |   |   |   |   |   |    |    |    |    | -  |

METHOD FOR PLANNING OR PROVISIONING DATA TRANSPORT NETWORKS

CROSS REFERENCE TO RELATED APPLICATIONS

This application is a national phase application based on PCT/EP02/13071, filed Nov. 21, 2002, the content of which is incorporated herein by reference, and claims the priority of European Patent Application No. 01128616.8, filed Nov. 30, 2001, and claims the benefit of U.S. Provisional Application Ser. No. 60/337,138, filed Dec. 10, 2001.

BACKGROUND OF THE INVENTION

1. Field of the Invention

The present invention relates a method for planning or provisioning data transport networks, in particular optical networks employing wavelength division multiplexing (WDM).

2. Description of the Related Art

Transport networks are wide area networks that provide connectivity for aggregated traffic streams. Modern transport networks increasingly employ wavelength division multiplexing (WDM) technology to utilize the vast transmission bandwidth of optical fiber. WDM is based on transmission of data over separate wavelength channels on each fiber. Presently, WDM is mainly employed as a "point-to-point transmission technology". In such networks, optical signals on each wavelength are converted to electrical signals at each network node. On the other hand, a "WDM optical networking technology", which has been developed within the last decade, and which is becoming commercially available, employs wavelengths on an end-to-end basis, without electrical conversion in the network.

Planning of a transport network refers to assigning network resources to a traffic demand. Efficient planning is essential in minimizing the investment made on the network required to accommodate a given demand. In WDM networks, traffic is carried by means of circuit switched connections, optically routed on the basis of their wavelength. In the context of WDM optical networks, planning means routing and wavelength selection for a set of end-to-end wavelength allocation demands (or "connection requests"), given a demand distribution and a network structure.

A WDM network is characterized by its physical topology, that is, by the manner in which its nodes are interconnected by optical links. Though the ring is the most studied and most common topology today, mesh networks are being developed and are beginning to be deployed.

FIG. 1 shows an example of a mesh network 100 to which planning methods may be applied. There, a set of switching nodes 101 is interconnected by a plurality of fiber links 102 to form a network. It is assumed that each path p between any pair of source and destination nodes (not necessarily adjacent) requires a dedicated wavelength w on each link belonging to the path itself. The pair (p, $\overline{w}$) will be referred as "lightpath", $\overline{w}$ being a vector collecting the wavelengths w used on each link of the path. If the path p links adjacent nodes the lightpath is typically referred as "lighthop". A source-destination node pair may require more than one lightpath. The typical context assumes that there is a fixed set of wavelengths available on each fiber, and therefore the connections are established at the expense of possibly multiple fibers on network links, typically bound in one or more optical cables. The switching nodes are the Optical Cross Connects (OXCs). They perform switching on the WDM transit lightpaths, preferably in all-optical way, that is, without intervention of electronics. In addition they may behave as terminal equipment for some lightpaths, performing add and/or drop functions. Further to switching, OXCs may effectuate wavelength conversion. In the context of planning, the term "wavelength" may refer to a label assigned to a lightpath in each link, instead of the actual value of the wavelength itself. Each fiber has a cost, typically reflecting the installed fiber material, optical amplifiers, and optical termination equipment at both ends of the link. The cost of the OXCs may also be taken into account. The objective of planning is typically taken as the minimization of the total network cost.

In WDM networks, routing is coupled with wavelength assignment, that is, which wavelength channel must be allocated to a lightpath in each link. The combination of these two functions is called Routing and Wavelength Assignment (RWA). In the case of multifiber links, RWA becomes Routing, Fiber and Wavelength Assignment (RFWA), as also a particular fiber must be selected on each link for a given lightpath. The complexity of the RFWA function greatly depends on the wavelength conversion capability of the switching nodes of the network. WDM networks may be distinguished in three categories, according to their wavelength conversion capability:
  a) Wavelength Path (WP) networks: no wavelength conversion capability is provided in the switching nodes;
  b) Virtual Wavelength Path (VWP) networks: every node is fully equipped with wavelength converters so that an incoming optical channel can always be converted on an idle output wavelength;
  c) Partial Virtual Wavelength Path (PVWP) networks: only part of the nodes are equipped with wavelength converters.

Two different traffic types may be offered to a WDM network:
  a) static traffic: a known set of permanent connection requests is assigned a priori to the network, which must be able to satisfy all the requests together, starting from the idle network;
  b) dynamic traffic: connection requests arrive at random instants to the nodes of the network and connections are semipermanent (i.e. temporary with long duration). Each connection is set up independently while other connections are active and network resources have already been allocated to other lightpaths. This situation is also referred in the known art as "provisioning". In general, with provisioning there is no warranty that the network is able to find enough idle resources to satisfy a particular connection request: in this case, the connection is blocked.

Static traffic is usually considered when a new network must be started up or an existing infrastructure must undergo a large scale reconfiguration or a physical topology upgrading. In these cases the network can be planned according to future traffic. Static planning can be so summarized: given a static traffic matrix, comprising a set of connection requests between pairs of source-destination nodes, find the optimum values of a set of network variables that minimizes a given cost function, under a set of constraints. The choice of variables, cost function and constraints greatly varies from case to case.

A known approach for static traffic planning consists in finding exact solutions, by formalizing the problem in order to obtain a mathematical representation based on matrices. Then, such problem can be solved as a linear or non-linear programming problem. This approach is described, for example, in B. Van Caenegan, W. Van Parys, F. De Turck, P. Demeester, "Dimensioning of survivable WDM networks", *IEEE Journal on Selected Area in Communications,* 16(7), pag.1146-1157 (1998). Unfortunately in WDM networks many variables are integer and the exact solution can be obtained only with very complex and time-consuming algorithms (Integer Linear Programming, or ILP, problem).

Dynamic traffic can be considered during normal operation lifetime of the WDM network. In dynamic traffic conditions the optimal RFWA must be determined for every new lightpath requested in a given instant of time by a node pair of the network, keeping into account the network resources already allocated to other active connections. To perform the three functions of RFWA on the new connection request, a routing, a fiber and a wavelength assignment criterion has to be chosen: the main approach is to choose in a heuristic way among known simple algorithms.

Path routing is usually done by "Shortest Path" (SP) or "Least Loaded Routing" (LLR). The SP method tends to route the new connection along the shortest physical path linking the source node to the destination node. In defining the distance two metrics can be used: the first, referred as "Minimum Hop" (mH), evaluates the number of links (or hops) concatenated to form the path; the second, referred "Minimum Length" (mL), considers the total physical length of the path. The LLR method tends to route the lightpath avoiding links with very high loads (i.e. a small number of free wavelengths).

Typical wavelength and fiber assignment criteria are "Pack", "Spread", "First Fit" and "Random". "Pack" and "Spread" consider the utilization of wavelengths on the network and define a priority order, promoting the most and the least used wavelength in the network, respectively. "First Fit" creates an arbitrary and preset priority order for wavelength selection which is kept unchanged throughout the whole network. In "Random" criterion, no priority order is predetermined and the wavelength assignment is made randomly.

Solving the static traffic planning with heuristic algorithms developed for dynamic traffic is known. For example, G. Maier, A. Pattavina, L. Roberti, T. Chich, "Static-Lightpath Design by Heuristic Methods in Multifiber WDM Networks", *Proceedings of OptiComm* 2000 *SPIE Conf,* Dallas, Oct. 2000, pag.64-75, disclose an approach to WDM multifiber network design and optimization under static traffic aimed to minimize the number of fibers in the network. The heuristic optimization comprises an initial setup of all the demanded lightpaths and an iteration during which the network is progressively improved by rerouting lightpaths and consequently eliminating fibers with a high number of unused wavelengths. Static traffic is managed with the same techniques as dynamic traffic by suitably sorting the static connection demands and offering them in sequence to the network. The authors used a tool named "layered graph" (sometimes called wavelength graph) as a working auxiliary representation of the network state. This representation, often used for dynamic traffic analysis or for static optimization in monofiber networks, was used by the authors for a multifiber network optimization with static traffic. An example of a layered graph representing a simple network is shown in FIG. 2. The layered graph in a multifiber WDM network is built by replicating the physical network topology on a set of (W×F) parallel planes or graphs, where W is the number of wavelengths used in the network and F is the maximum number of fibers in a link: in FIG. 2, a network having two fibers per link (F=2) and two wavelengths per fiber (W=2) has been represented by a layered graph having four layers. Each of the n physical nodes of the network (A, B, D, E, F in FIG. 2) appears as a virtual image node in all the (W×F) planes. A further image of the node eventually represents its add-drop function. In FIG. 2, each of the image nodes belonging to the various layers has been labeled by the notation $N_f^w$, where N is the label of the node, f is the label of the fiber, w is the label of the wavelength. Add-drop function of the nodes has been represented in FIG. 2 by the source-termination image nodes labeled by $N_{s,t}$, being outside of the various layers. Vertical (bidirectional) arcs between the image nodes represent OXC switching operations (fiber switching and wavelength conversion). If a physical node is equipped with wavelength converters its corresponding virtual nodes in different W planes are joined by vertical arcs; otherwise only planes having the same wavelength are vertically connected. FIG. 2 represents a network in which no wavelength conversion is provided. Associating a horizontal arc on the layered graph to a lighthop on the network implies both the adoption of the corresponding physical link of the topology and the choice of one particular fiber and one particular wavelength within it. In the Maier et al. article mentioned above, a single algorithm performs all these operations exploiting the layered graph. Suitable weights are associated to the nodes, to the vertical arcs and to the horizontal arcs, so the layered graph is transformed into a weighted graph. Then, a Dijkstra algorithm finds the connection path with the least total weight on the weighted graph, thus obtaining the RFWA of the lightpath. After an initial lightpath setup has been completed, all the empty fibers are pruned. Then an optimization iteration begins. An optimization counter k is defined and initially set to 1. Any "k-fiber", that is a fiber containing only k occupied wavelengths and (W−k) unused wavelengths, is detected. The lightpaths routed on that k-fiber are considered sequentially. Each of them is de-allocated and allocated again with the general RFWA criteria chosen for the optimization. If a new allocation is not possible the old lightpaths are maintained. When rerouting of all the lightpaths on the selected fiber has been attempted, the procedure is repeated on all the other k-fibers of the network. Then all the empty fibers are pruned again, k is incremented and another iteration begins. The whole is repeated until k=(W−1). As recognized by the same authors, the disclosed tool does not provide protection lightpaths for the connection lightpaths found.

The use of the WDM technique on optical fibers allowed a progressive growing of the transmission capacity of the network, with very high bit rates and very high data traffic volumes on a limited number of optical paths. As a consequence, a failure occurring in a component of the network (for example a fiber cut or even a whole cable cut) becomes more and more critical, as a failure can result in a huge loss of information. Clearly, the most critical situation is represented by the failure of a whole node. A network is called "survivable" if it allows the re-routing of a connection involved in a failure event. Restore techniques currently used are the Protection and the Restoration.

With the Protection technique, spare resources are provided in the network, to be used in case of failure. Typically, a dedicated protection path is provided for any working path, to be used in case of failure on the working path. Such protection path is disjoint from the working path. With the Restoration technique, restore paths are dynamically allocated in case of failure. In Applicants' opinion, Restoration techniques require higher restore times, as they necessitate of complex signaling techniques between the nodes involved by the failure, and do not guarantee survivability, as the dynamic search of a restoration path may be unsuccessful.

Patent application EP 0969620, to Lucent Technologies Inc., discloses heuristic provisioning methods for a static set of connections on a given WDM optical network technology. A first class of solutions relates to provisioning in so-called primary networks, that is, networks that do not account for possible network failures. A second class of solutions adapts and extends the heuristic provisioning solutions used in primary networks for use in restorable networks. Heuristic methods disclosed in the '620 patent application are based on a so-called "two-step" algorithm, in which each selected connection is first removed from the network, then an admissible lightpath that has the minimum metric (or cost) is found via the Dijkstra shortest path algorithm, and finally the connection is rerouted on that lightpath.

In Applicants' opinion, the use of a two-step algorithm is not convenient, because it may fail to find solutions in some situations. Basically, a two-step algorithm consists in: a) identifying the shortest path (or the path giving the lower cost) between two nodes and associating to this shortest path a working lightpath in the network; b) removing such shortest path and finding a further shortest path between the same two nodes in the thus modified topology, and associating to this further shortest path a spare lightpath in the network. This approach can be applied in order to find pairs of paths on a network, for example pairs of working-spare paths. However, for example, FIG. 3a shows an example of a simple network topology where the two-step approach fails to find a suitable pair of paths from node A to node Z. Let the weight associated to any link be equal to 1 for all links but for AD and BE: let the weight of AD and BE be equal to 2. ABCZ is the shortest path between the nodes A and Z. FIG. 3b shows how the topology is modified by the first step of removing the shortest path ABCZ. According to FIG. 3b, no further path can be found from node A to node Z: thus, no pair of paths between A and Z could be found. On the contrary, FIG. 3c shows that the two disjoint paths ADCZ and ABEZ exist between nodes A and Z.

Applicants have faced the problem of providing a tool for static or dynamic traffic planning of a WDM optical network, such tool providing pairs of working-protection paths for one or more connection requests to be setup, in order to plan or provision a survivable network with dedicated protection. Heuristic algorithms different from the two-step algorithm were considered, in order to avoid time consuming and complex ILP algorithms, at the same time obtaining high reliability in finding the working-protection pairs of paths. In particular, in case of static traffic planning, Applicants have also faced the problem of minimizing the cost of the survivable network.

As disclosed in R. Bhandari's book "Survivable Networks—Algorithms for Diverse Routing", Kluwer Academic Publishers, 1999, a heuristic one-step algorithm capable of determining shortest pairs of disjoint paths on a given topology, in a more reliable way with respect to the above described two-step algorithm, is the Bhandari algorithm, disclosed at chapter 3 of the same book. Bhandari algorithm for finding the edge-disjoint shortest pair of paths between a given pair of vertices is the following:
a. Select one of the two vertices as the source vertex and the second as the destination vertex, find the shortest path, for example using the modified Dijkstra algorithm.
b. Replace each edge of the shortest path by a single arc directed towards the source vertex.
c. Make the length (weight) of each of the above arcs negative.
d. Find the shortest path on the thus modified graph, for example by using the modified Dijkstra algorithm.
e. Transform to the original graph, and erase any interlacing edges of the two paths found. Group the remaining edges to obtain the shortest pair of edge-disjoint paths.

An application of this algorithm to the simple network topology already shown in FIGS. 3a-b-c is shown in FIGS. 4a-b-c. Let the weight associated to any link be equal to 1 for all links but for AD and BE: let the weight of AD and BE be equal to 2. FIG. 4a shows the graph after step a), after which the path ABCZ has been found as shortest path. FIG. 4b shows the graph after steps b)-c)-d), after which the shortest path ADCBEZ has been found on the modified graph. As it can be seen from a comparison between FIG. 4a and FIG. 4b the link BC is interlaced between the first and the second shortest path. FIG. 4c shows the pair of disjoint paths ADCZ and ABEZ found after erasing the common link BC and grouping the remaining links of the two shortest paths found at steps a) and d).

A similar algorithm allows the finding of the vertex-disjoint shortest pair of paths between a given pair of vertices:
a. For the given pair of vertices under consideration, find the shortest path, for example using the modified Dijkstra algorithm.
b. Replace each edge on the shortest path by an arc directed towards the destination vertex.
c. Split each vertex on the shortest path into two co-located sub-vertices joined by an arc of length (weight) zero. Direct this arc towards the destination vertex. Replace each external edge connected to a vertex on the shortest path by its two component arcs (of length or weight equal to the edge length or weight); let one arc terminate on one sub-vertex, and the other arc emanate from the other sub-vertex such that along with the zero-length arc a cycle results.
d. Reverse the direction of the arcs on the shortest path. Also make their lengths (or weights) negative.
f. Find the shortest path on the thus modified graph, for example by using the modified Dijkstra algorithm.
g. Remove the zero length (weight) arcs; coalesce the sub-vertices into their parent vertices. Replace the single arcs of the shortest path with their original edges (of positive length or weight). Remove interlacing edges of the two paths found above to obtain the shortest pair of paths.

Vertex-disjoint paths are also edge-disjoint paths, while the converse is not necessarily true.

Bhandari's book does not deal with WDM networks and discloses its algorithms as applied to a graph having a single layer.

Applicants have faced the problem of adapting the Bhandari algorithms for finding edge- or vertex-disjoint pairs of paths on a layered graph representing an optical network, in particular a multi-fiber WDM network. In this context, edge-disjoint paths on the layered graph correspond to link-disjoint paths on the network, and vertex-disjoint paths correspond to node-disjoint paths on the network. Applicants have understood that at least some of the steps of the Bhandari algorithms are not directly applicable to a graph comprising a plurality of layers representing an optical network: in such graph, in fact, the layers are correlated with each other, due to the fact that the image nodes and the horizontal arcs laying in each layer represent the same physical links and the same physical nodes in the network, respectively. This framework is further complicated by the fact that the network can have or not wavelength conversion capability. Applicants have understood that if the algorithms do not take into account the correlations between the layers (correlations which may be different case by case, for example in case of WP, VWP or PVWP network), one may find disjoint paths in the layered graph, but being actually not disjoint in the physical network.

SUMMARY OF THE INVENTION

Applicants have found how to adapt the Bhandari algorithms to a layered graph representing an optical network, allowing to find edge- or vertex-disjoint pairs of paths on the layered graph, to be associated to pairs of disjoint working-protection lightpaths in the network, for each given connection request between a source and a destination node. In particular, Applicants have found how to adapt the Bhandari algorithm for finding pairs of working-protection lightpaths either in WP networks, or in VWP networks, or in PVWP networks. The algorithm can advantageously be used also for planning a survivable network.

In a first aspect thereof, the present invention relates to a method for allocating a working lightpath and a spare lightpath to a connection request between a source node and a destination node of an optical network.

In a second aspect thereof, the present invention relates to a method for static traffic planning of a survivable optical network.

In a third aspect thereof, the present invention relates to a reconfigurable optical network.

In a fourth aspect thereof, the present invention relates to a computer program product loadable into the memory of a computer, suitable for outputting information for allocating a connection request between a source and a destination node of an optical network.

In a fifth aspect thereof, the present invention relates to a computer program product loadable into the memory of a computer, suitable for outputting information for static traffic planning of a survivable optical network.

Preferred aspects of the present invention are defined in dependent claims.

BRIEF DESCRIPTION OF THE DRAWINGS

Features and advantages of the present invention will be better illustrated by the following detailed description, herein given with reference to the enclosed drawings, in which.

DETAILED DESCRIPTION OF THE INVENTION

Figure 1:
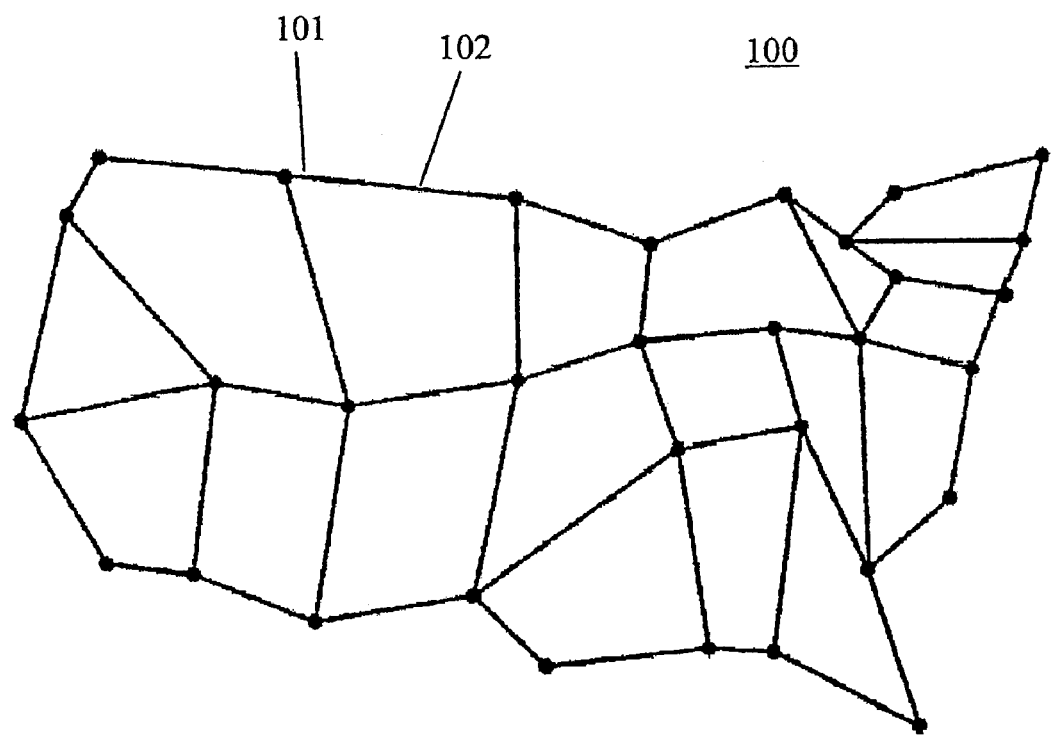
FIG. 1 schematically shows a mesh network.
Figure 2:
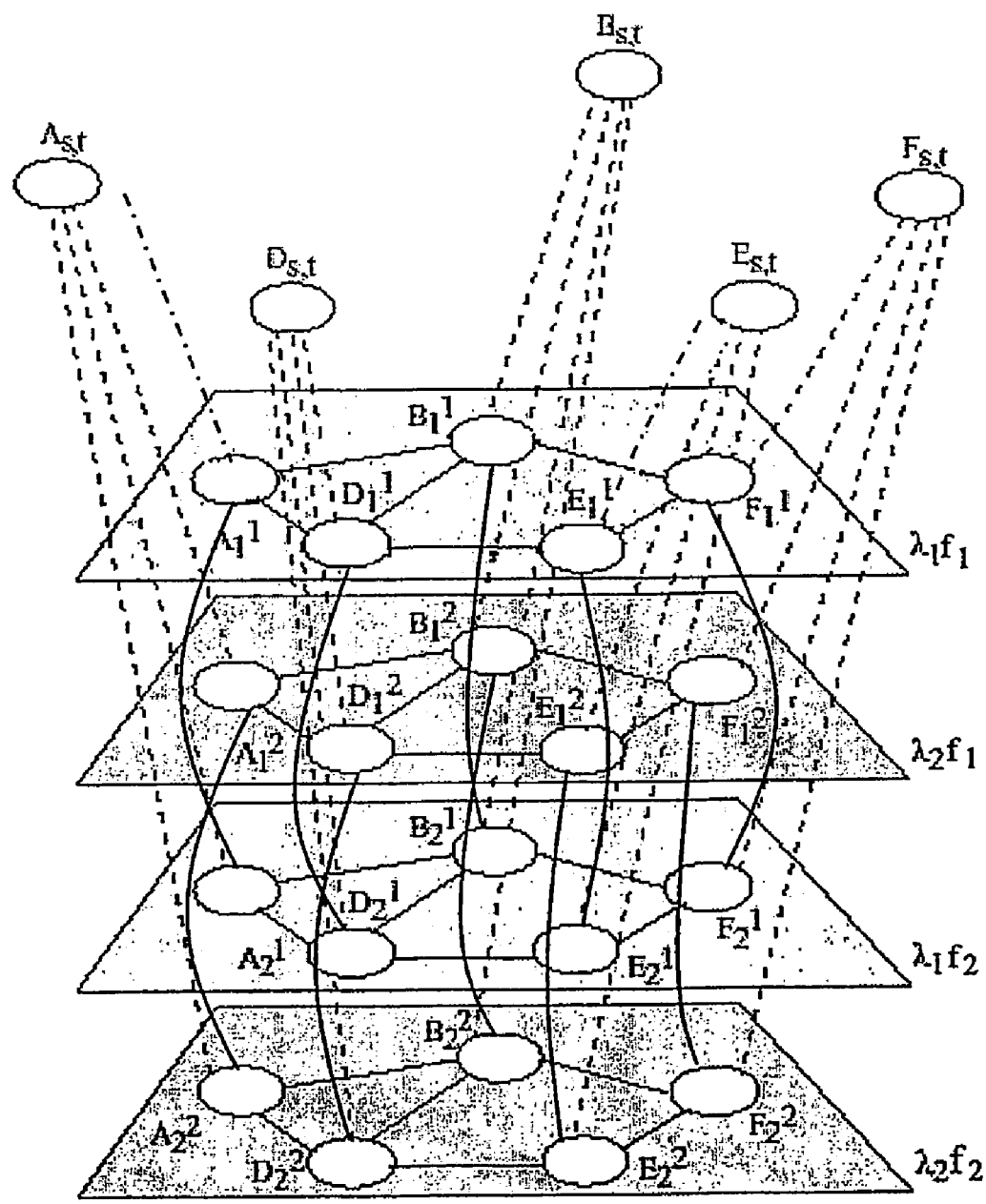
FIG. 2 shows an example of layered graph representing a simple network wherein no wavelength conversion is provided.
Figure 3A:
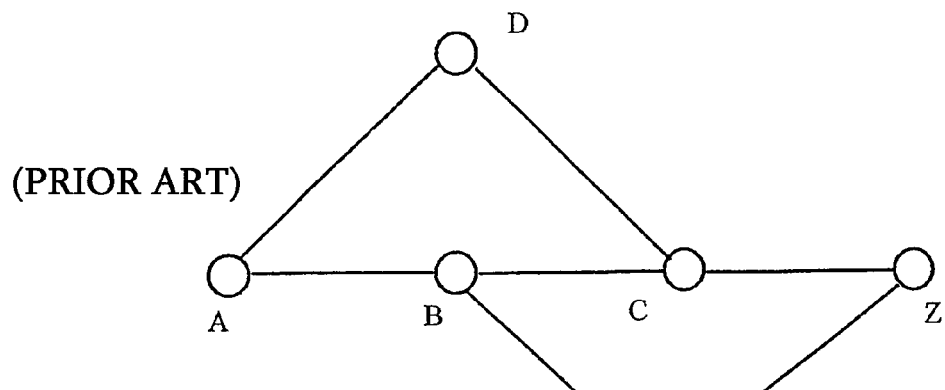
FIGS. 3a-b-c show how a two-step algorithm may fail to find a pair of paths between two nodes A and Z, while such pair exists.
Figure 3B:
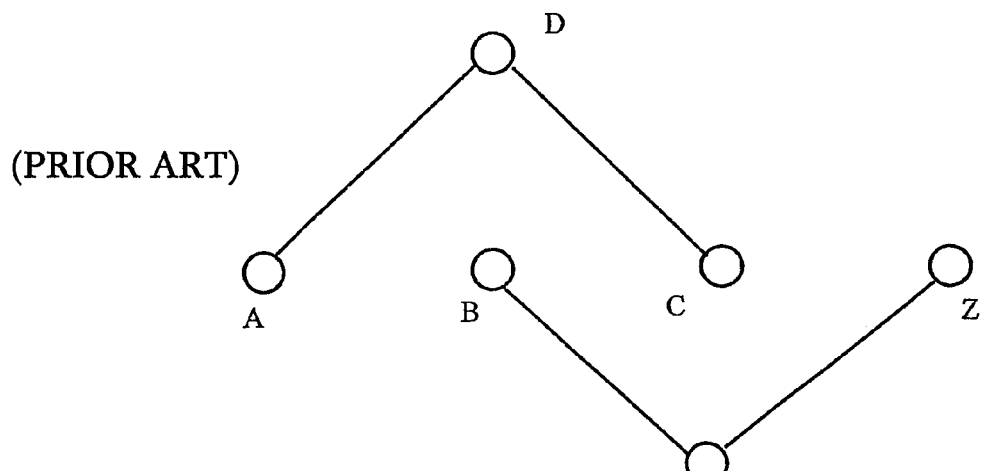
Figure 3C:
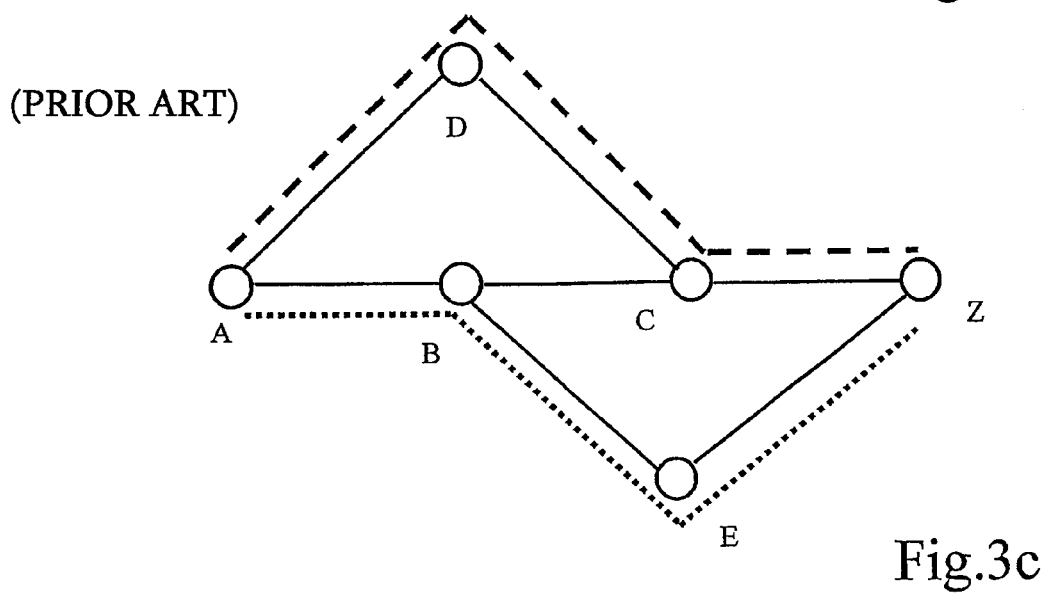
Figure 4A:
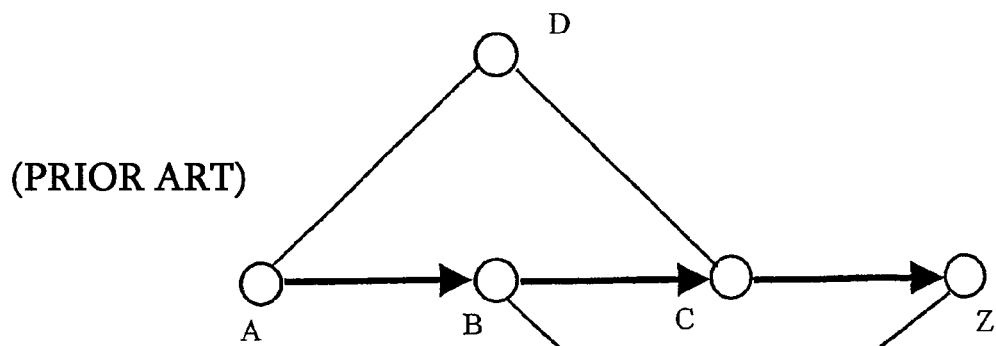
FIGS. 4a-b-c show how the Bhandari algorithm succeeds in finding the shortest pair of paths between the two nodes A and Z.
Figure 4B:
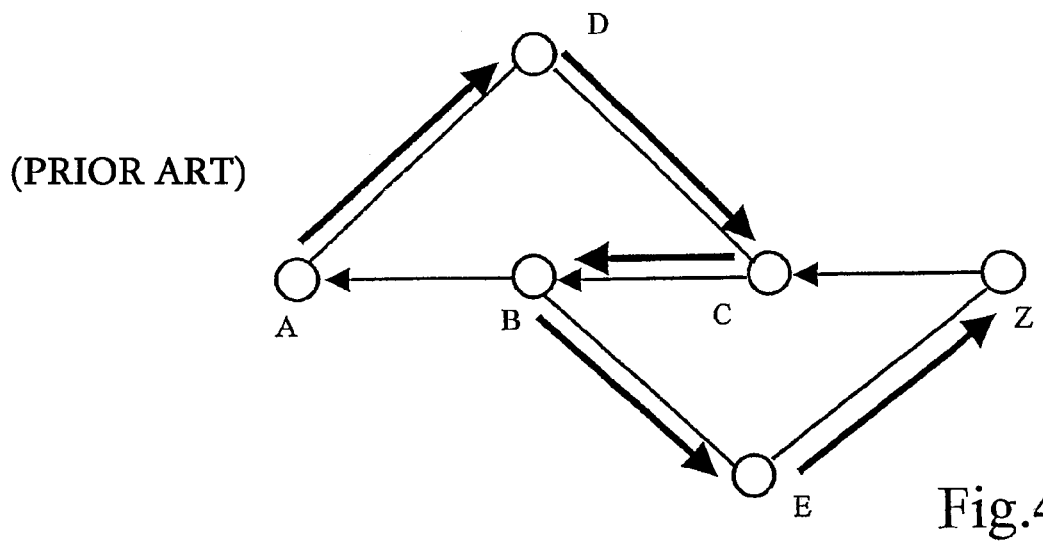
Figure 4C:
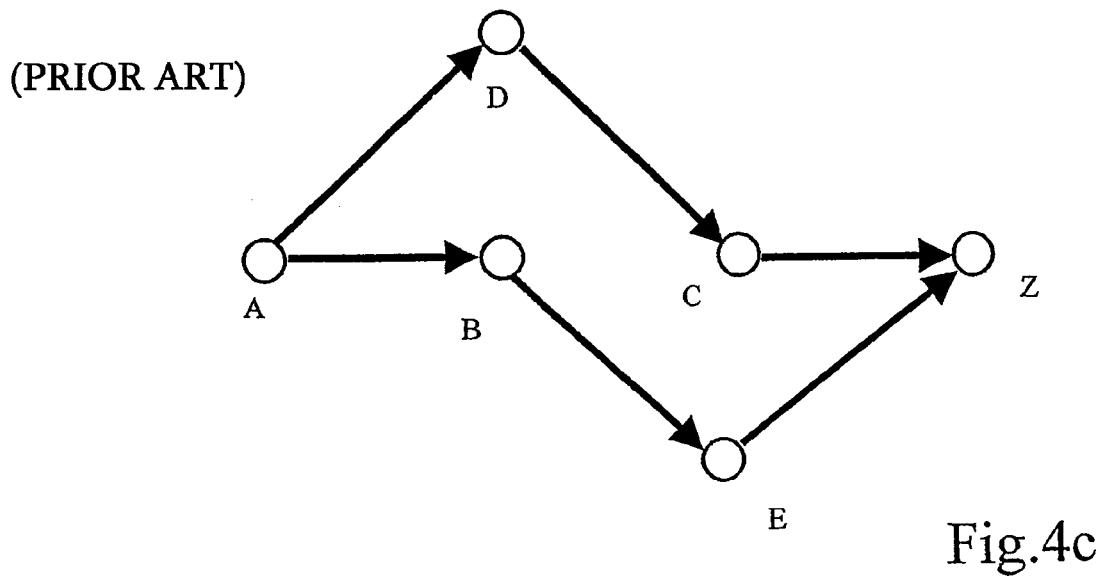

The setup of one or more lightpaths on a WDM network, in order to satisfy one or more connection requests, typically requires two main steps:

a) search of a RFWA solution: collection of all the informations needed for the setup of the lightpath, that is, how to route the channels on the fibers in the various links crossed by the lightpath;

b) network configuration: actions performed on the network equipment (mainly the OXCs), according to the informations collected in step a), in order to create and correctly route the channels from the source node to the destination node.

Step a) is performed by a network manager, that can be centralized or distributed in the network. RFWA can be performed for a single connection request, in case of dynamic planning, or for a set of connection requests, in case of static traffic. The network manager can be an actual physical system, typically an automatic system, which is active in the life period of the network, or it may be a "virtual concept" corresponding to the offline planning phase of a fully static network. In any case, the network manager typically needs a model of the network to carry out its operations. A network model can be any kind of abstract representation or data structure that contains all the informations regarding the network, such as for example: physical topology, virtual topology (connection requests), characteristics of links and nodes, network state (i.e. which resources have already been allocated to which lightpath and which are instead available). The network model is typically used by algorithms that the network manager runs in order to evaluate all the RWFA informations necessary to control the network. During the evaluation process these algorithms may also temporary alter the state of the network model, e.g.

tentatively rerouting a connection: this does not imply any change in the state of the real network.

Step b) is performed by a network controller, that interacts with the network manager. In particular, when the network manager has completed its evaluation process using the network model, it transfers the RWFA information to the network controller, which has the duty of accordingly changing the state of the real network by reconfiguring its switching elements.

The network manager is often implemented as a computer program. The network model is often a suitable data structure, recognized and used by such computer program. When RWFA is solved with heuristic methods (e.g. in the case of dynamic RFWA or static planning by dynamic RFWA), a network representation based on graphs is preferred. A graph is a set of edges (representing the links of the network) and vertices (representing the nodes of the network), organized according to a particular topology, i.e. on the basis of their adjacency relations. One or more sub-graphs may be defined inside a graph. Moreover, all the elements of the graph are labeled. The label is a list of properties of an element that may include: an identifier, a state (such as for example "free" or "already allocated"), one or more weights (e.g. cost, physical length, attenuation, etc.) and so on. In practice, a graph modeling a network may be implemented via software, as a pointer structure in which each element (vertex or edge) contains a list of pointers to its neighbors, so as to represent the adjacency relations of the topology, and a label containing a list of properties.

In the present invention, the network model representing the real optical network for the search of a RFWA solution is a layered graph. Each layer of the layered graph is a sub-graph, labeled by a fiber-wavelength pair. Edges are referred as horizontal arcs, and in particular may be oriented arcs. Vertices are referred as image nodes. Horizontal arcs and image nodes may be defined by at least triplets including an identifier and the fiber-wavelength pair of the layer on which the horizontal arc or the image node lays. Possibly, vertical arcs connect at least some of the corresponding image nodes laying in different layers, according to the type of network (WP, VWP, PVWP). The vertical arcs may be defined by one triplet identifying its source image node and a pair identifying the destination layer.

In the following, the terms "corresponding horizontal arcs" will refer to arcs laying in different layers of the layered graph but representing the same physical link of the network. Further, the terms "corresponding image nodes" will refer to image nodes laying in different layers of the layered graph but representing the same physical node of the network.

According to the present invention, the adaptation of the Bhandari algorithm for finding one edge-disjoint shortest pair of paths on a layered graph representing an optical network, typically a WDM network, can be generally stated as the following:

assign a cost to the elements of the layered graph, in particular to the horizontal arcs;

find a shortest path on the layered graph (by "shortest path" it is meant a path having minimum cost);

modify the layered graph by introducing so called "inverted horizontal arcs" in place of the horizontal arcs of the shortest path found and in place of possible corresponding horizontal arcs thereof, such corresponding horizontal arcs connecting, in the original layered graph, image nodes connected by vertical arcs to the image nodes crossed by the shortest path found (each of the introduced inverted horizontal arcs has an orientation and a cost opposite with respect to the orientation and the cost of the respective corresponding horizontal arc of the first shortest path), and by removing possible further horizontal arcs corresponding to the horizontal arcs of the shortest path found, such corresponding horizontal arcs connecting, in the original layered graph, image nodes not connected by vertical arcs to the image nodes crossed by the shortest path found;

find a further shortest path on the modified layered graph;

eliminate any "co-linked" horizontal arc of the first and the second shortest path (two horizontal arcs are "co-linked" in the layered graph if they represent the same physical link of the network, independently of their orientation);

build a pair of disjoint paths using the horizontal arcs of the first and the second shortest path remaining from the previous step of eliminating, if necessary by using vertical arcs suitable to connect horizontal arcs laying in different layers.

According to the present invention, the adaptation of the Bhandari algorithm for finding one vertex-disjoint shortest pair of paths on a layered graph representing an optical network, typically a WDM network, is a modification of the previous algorithm, in which at least the image nodes of the first shortest path and the corresponding nodes thereof are split in an original image node and in a dummy image node during the step of modifying the layered graph and an oriented horizontal arc having a null cost is introduced connecting each dummy image node with its respective original image node. The split nodes are then coalesced after the finding of the second shortest path.

Applicants have found that the above algorithms allow to find pairs of disjoint paths on the layered graph, actually representing disjoint paths on the physical network. In particular, Applicants have found that the particular way in which the modified layered graph is provided for the determination of the second shortest path allows to overcome the problem of the correlations of the various layers of the layered graph. Then, the elimination of the possible co-linked arcs belonging to the determined first and the second shortest path allows to finally obtain the disjoint paths.

A detailed description explaining how the above algorithms apply to WP, VWP and PVWP WDM networks will be explained in the following by considering the simple network topology of FIG. 5. For simplicity it will be assumed that each link has two bidirectional fibers ($f_1$, $f_2$), and that each fiber uses at most two wavelengths ($w_1$, $w_2$). This has not to be intended as limiting the invention, as the same procedure can be applied with any number of fibers per link (either bidirectional or monodirectional) and/or any number of wavelengths per fiber. The cases of WP, VWP and PVWP networks will be presented separately. The network topology of FIG. 5 will be represented by a layered graph having four layers, corresponding to the four labeling pairs of fiber-wavelength ($f_1,w_1$), ($f_1,w_2$), ($f_2,w_1$), ($f_2,w_2$). The allocation of a single connection request between the node A (source) and the node Z (destination), or, in other words, the allocation of a pair of working-protection paths between the source node A and the destination node Z, will be discussed.

Actual operations identified in the method steps may be implemented in suitable software code portions of a computer program, and carried out by any well-known general purpose computer having appropriate processing abilities, as will appear to those skilled in the art. In the following, there will be presented descriptions of processing steps that will enable those skilled in the art to realize computer program codes appropriate to particular contexts and facilities, such as particular machines, computer languages, operating systems and the like.

Case 1: WP Network—Edge-disjoint

In a WP network the nodes have not wavelength conversion capability. Thus, each lightpath (working or spare) associated to a connection request uses at most one wavelength. The working lightpath can use a different wavelength with respect to the spare lightpath (wavelength agility). Alternatively, the working and the spare lightpath can use the same, wavelength.

Figure 5:
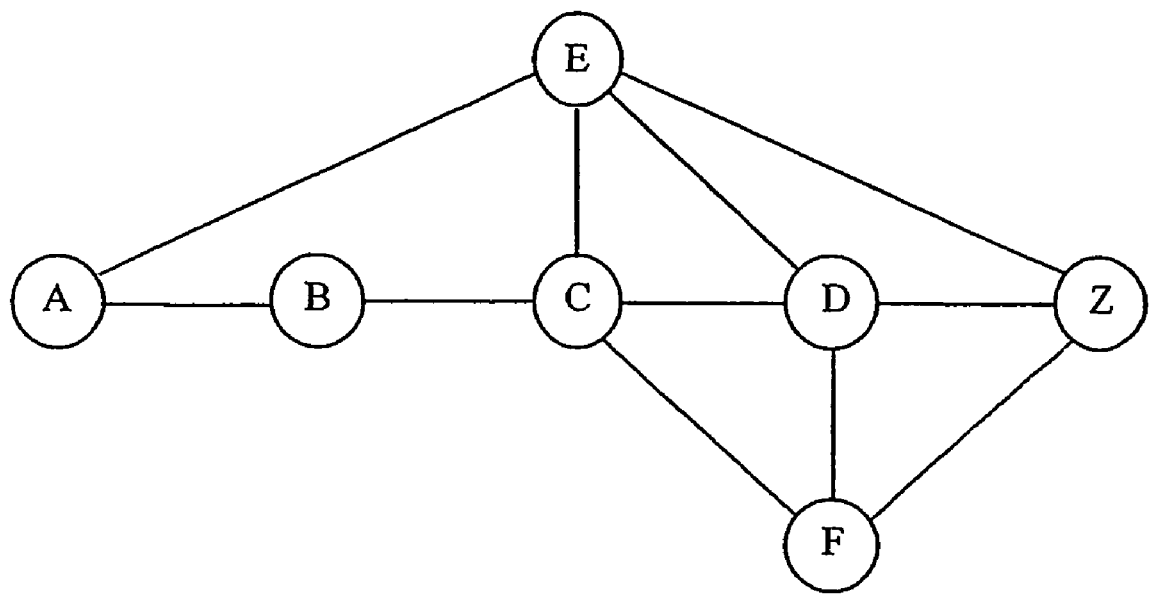
FIG. 5 schematically shows a simple network topology.
Figure 6A:
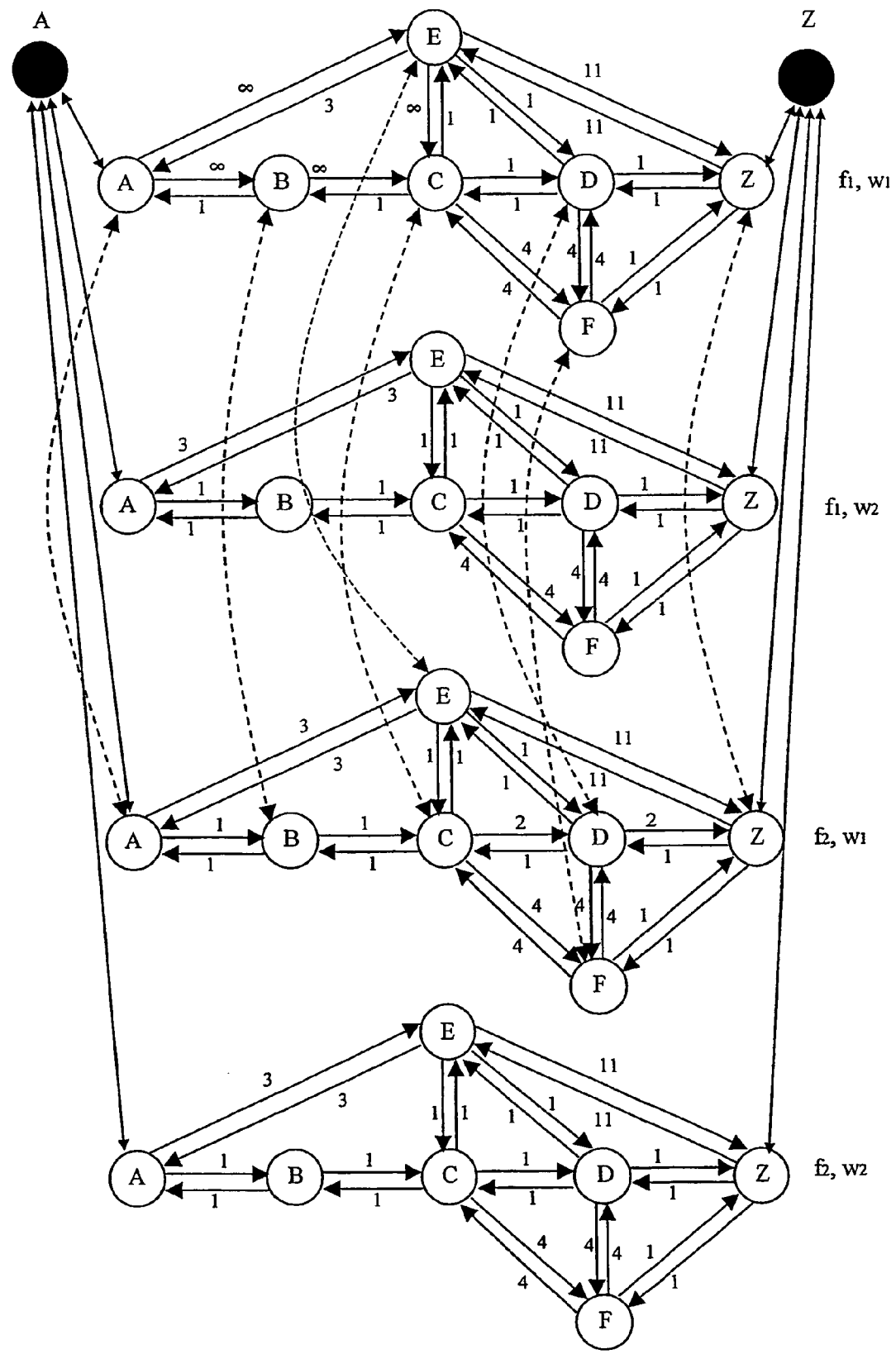
FIGS. 6a-b-c-d-e-f-g show the adaptation of a Bhandari algorithm on a layered graph representing a WP network having the topology of FIG. 5, in order to find a pair of edge- or vertex-disjoint working-spare paths.

FIG. 6a shows the layered graph representing the network of FIG. 5 in this case. The layered graph has four layers corresponding to the labeling pairs $(f_1,w_1)$, $(f_1,w_2)$, $(f_2,w_1)$, $(f_2,w_2)$. Bidirectional horizontal arcs between image nodes are reported in each layer, representing the links between the nodes of the network of FIG. 5. Bidirectional vertical arcs connect corresponding image nodes belonging to the layers labeled with the same wavelength and a different fiber, representing the capability of fiber switching in each node. For the sake of simplicity, in FIG. 6a only the vertical arcs connecting corresponding nodes laying in the layers labeled with the wavelength $w_1$ have been shown. However, it has to be intended that similar arcs should connect corresponding nodes laying in the layers labeled with the wavelength $w_2$. On the contrary, no vertical arcs connect corresponding image nodes laying in layers labeled with different wavelengths, as in the present case the network has not wavelength conversion capability. "Oblique" arcs, that are arcs connecting non-corresponding image nodes in different layers, are forbidden, as having no physical significance in the network. For the sake of simplicity, add-drop function was shown in FIG. 6a only for the two source-destination image nodes A-Z. This has not to be intended as limiting the invention, in that any of the nodes of the network may have add-drop capability or not. Add-drop capability of a node is represented in the layered graph by providing a further image of such node outside of the layers, connected by bidirectional vertical arcs to its corresponding image nodes in all the layers of the layered graph.

Each horizontal arc has an associated cost (or weight), that may depend on many factors. Such cost can be assigned following criteria readily available to the skilled in the art, for example the path routing and/or wavelength and fiber assignment criteria mentioned in the introductory part of this description, such as:
  a criterion for fiber and wavelength assignment (Pack, Spread, First Fit, Random);
  a criterion for path routing, such as Shortest Path (minimum Hop or minimum Length) or Least Loaded Routing;
  the number of amplifiers or other equipments possibly included in the corresponding link;
  the actual cost of the fibers used; and so on.

In the WP case, the vertical arcs may be assumed to have a null cost, corresponding only to a fiber switching in each node. This has not to be intended as limiting the invention, as a cost different from zero and different for the vertical arcs can be assigned, for example to account for different actual cost or performance of different types of switching equipment. Although not shown in FIG. 6a, a cost can be also assigned to the image nodes, for example to account for the actual cost or performance of node equipment.

A horizontal arc used by another connection request already allocated has to be excluded by the search of a pair of working-spare paths for a new connection request. This can be done for example by assigning to the horizontal arc an infinite cost. For the purposes of the present invention, an "infinite" cost can be the maximum possible number allowed by the computing means used for the application of the algorithm, or the maximum cost among those already assigned, or even a "flag" associated to the arc having two states (on-off, existing arc-non existing arc). On the other hand, the cost of the vertical arcs may be left unchanged after the allocation of a connection request, in that the corresponding nodes connected by the vertical arcs can be crossed by different lightpaths, in dependence of the degree of the node (i.e. the number of its adjacent nodes).

In FIG. 6a, a cost has been assigned to the horizontal arcs: such cost is represented by the numbers provided near each arc of the layered graph. As it can be seen, an infinite cost has been associated to the disjoint paths AEC and ABC in the layer labeled with the pair $(f_1, w_1)$, representing an already allocated pair of working-spare paths between the nodes A and C. In the following, a layered graph having associated costs for each arc will be also referred as "weighted layered graph".

In order to allocate a connection request between the source node A and the destination node Z, that is, in order to find a pair of working-spare paths between A and Z, the following steps are performed.

Figure 6B:
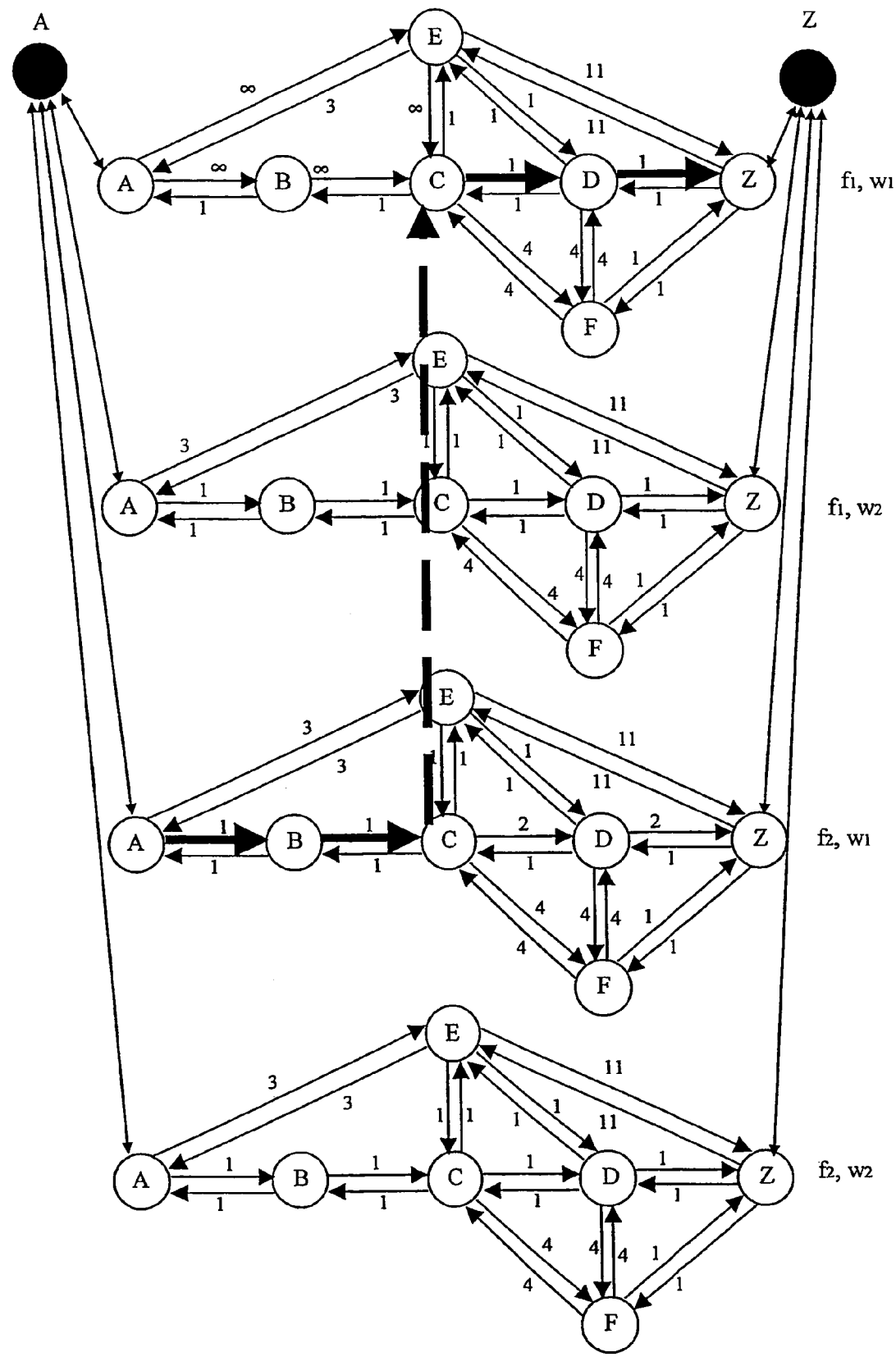

In a first step, a first shortest path is found in the layered graph between the nodes A and Z. For example, a Dijkstra algorithm can be applied in order to find the first shortest path. Such algorithm is well known in the art and is described, for example, in the above mentioned Bhandari's book, at chapter 2. Another shortest path algorithm that can be applied is the breadth-first-search (BFS) algorithm, also described in the above mentioned Bhandari's book. However, the skilled in the art can choose another shortest path algorithm. FIG. 6b shows the shortest path identified in the exemplary weighted layered graph according to FIG. 6a. As the network is a WP network, the first shortest path uses only the wavelength $w_1$. In node C fiber switching is performed from fiber $f_2$ to fiber $f_1$. In FIG. 6b vertical arcs have been removed for simplicity.

In a second step, the horizontal arcs belonging to the first shortest path, the corresponding arcs in all the layers of the layered graph thereof and the arcs having an orientation opposite to all these are removed from the layered graph. In other words, all the arcs representing the links traversed by the first shortest path are removed from the layered graph. The "removing" of an arc from the layered graph should correspond to rendering such arc forbidden for a subsequent path finding: thus, it may be accomplished either by effectively removing the arc by the layered graph or by assigning an infinite cost to the arc.

In a third step, a number of so-called "inverted horizontal arcs" are introduced in the layered graph in place of at least some of the arcs removed in the second step. In a WP network these inverted horizontal arcs are introduced between the image nodes crossed by the first shortest path and between the corresponding image nodes thereof laying in layers labeled by the wavelength used in the first shortest path. These inverted arcs have an orientation opposite with respect to that of the original arcs belonging to the first shortest path and a cost having the same absolute value and an opposite sign with respect to those of the respective original arcs belonging to the first shortest path.

Equivalently, the step of introducing the inverted horizontal arcs may precede the step of removing the horizontal arcs of the first shortest path and corresponding arcs thereof.

In such case, only the corresponding horizontal arcs which have not been subjected to inversion are removed.

In any case, the whole of the second and the third step provides, in the WP case, a modified layered graph having: a) inverted horizontal arcs in place of the horizontal arcs of the first shortest path and in place of the corresponding horizontal arcs thereof laying in layers labeled by the wavelength used in the first shortest path; b) no horizontal arcs in place of the horizontal arcs corresponding to the horizontal arcs of the first shortest path, but laying in layers labeled by wavelengths not used by the first shortest path.

It has to be noticed that the inverted horizontal arcs are introduced in the layers labeled by the wavelength used by the first shortest path, as in the WP case the vertical arcs may connect only corresponding image nodes laying in layers labeled by the same wavelength.

Figure 6C:
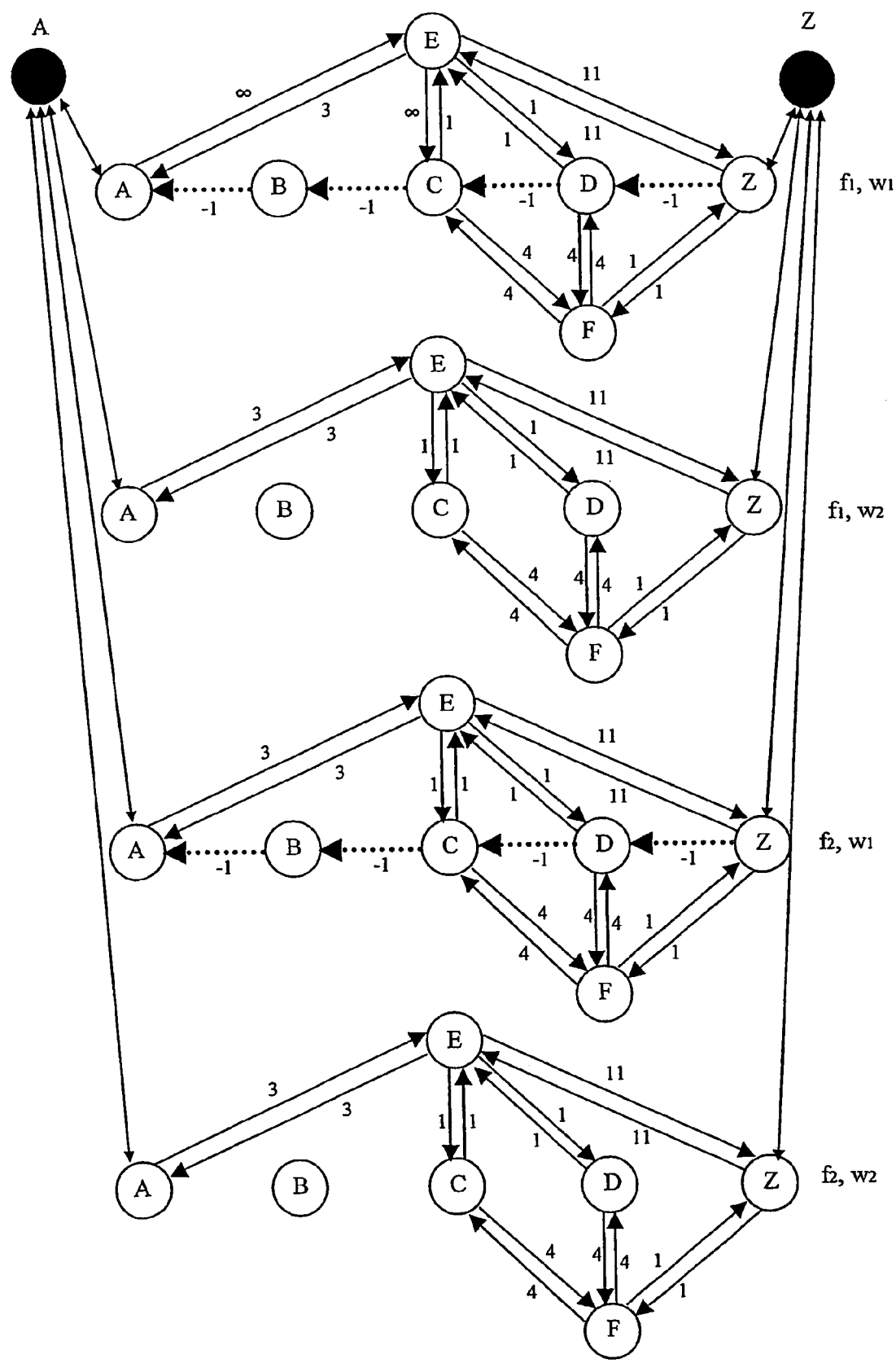

FIG. 6c shows the modified layered graph in the example under analysis. In FIG. 6c vertical arcs have been removed for simplicity. However, it has to be noticed that the vertical arcs possibly included in the first shortest path are not modified in the second and third step.

Figure 6D:
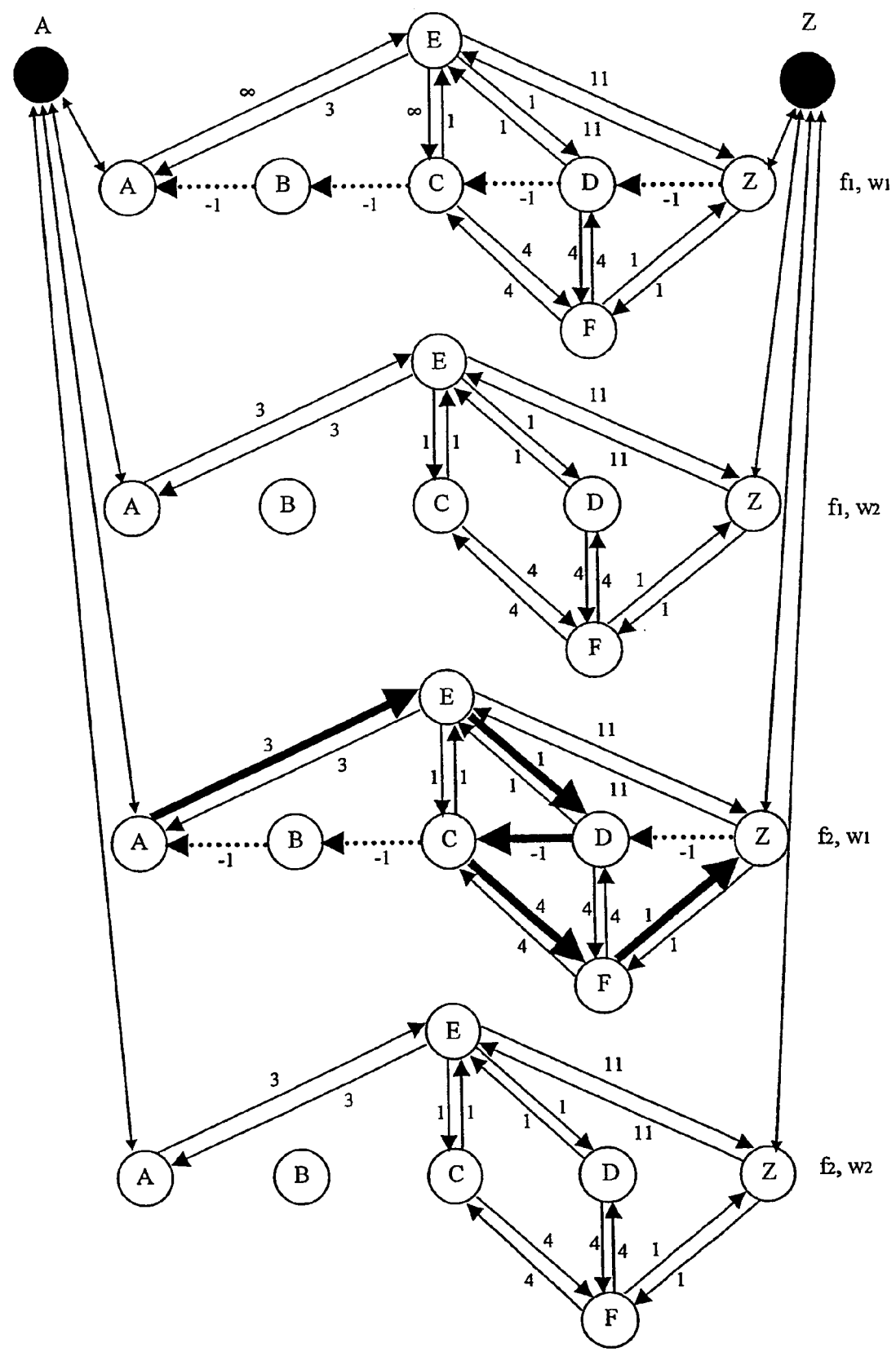

In a fourth step, a shortest path is found, in the modified layered graph, between the nodes A and Z. This further shortest path will be referred in the remainder of the description as "second shortest path". For example, a modified Dijkstra algorithm can be applied in order to find the second shortest path. Also this algorithm is described in the above mentioned Bhandari's book, at chapter 2. Another shortest path algorithm that can be applied for finding the second shortest path is the BFS algorithm. However, the skilled in the art can choose another algorithm suitable for finding a shortest path in a graph comprising negative weights or costs. FIG. 6d shows a second shortest path found in the modified layered graph of FIG. 6c.

The first and the second shortest path may use "co-linked horizontal arcs", that are corresponding arcs representing the same link on the network, independently of their orientation, belonging both to the first and to the second shortest path. For example, by comparing FIG. 6b with FIG. 6d, the arcs linking the corresponding image nodes C and D used by the first shortest path in the layer labeled with ($f_1$, $w_1$) and by the second shortest path in the layer ($f_2$, $w_1$) are co-linked. In a fifth step, the co-linked arcs are removed. Now, the original arcs of the original layered graph may be restored (both in orientation and cost). By grouping the remaining horizontal arcs belonging to the first and second shortest path it is possible to reconstruct a pair of paths in the layered graph, if necessary by the aid of suitable vertical arcs allowing linking between different layers. This pair of paths in the layered graph can be associated to the pair of edge-disjoint working-spare paths in the network of FIG. 5. In the considered example, the co-linked arcs removed are those linking node C with node D. Thus, the remaining arcs of the first shortest path are: AB and BC on layer ($f_2$, $w_1$), DZ on layer ($f_1$, $w_1$); the remaining arcs of the second shortest path are: AE, ED, CF, FZ on layer ($f_2$, $w_1$). The reconstruction of two paths from source node A to destination node Z starting from such remaining arcs gives:

a) AB→BC→CF→FZ on layer ($f_2$, $w_1$)

b) AE→ED→DZ starting from layer ($f_2$, $w_1$) in the first two hops and jumping to layer ($f_1$, $w_1$) in the last hop.

Figure 6E:
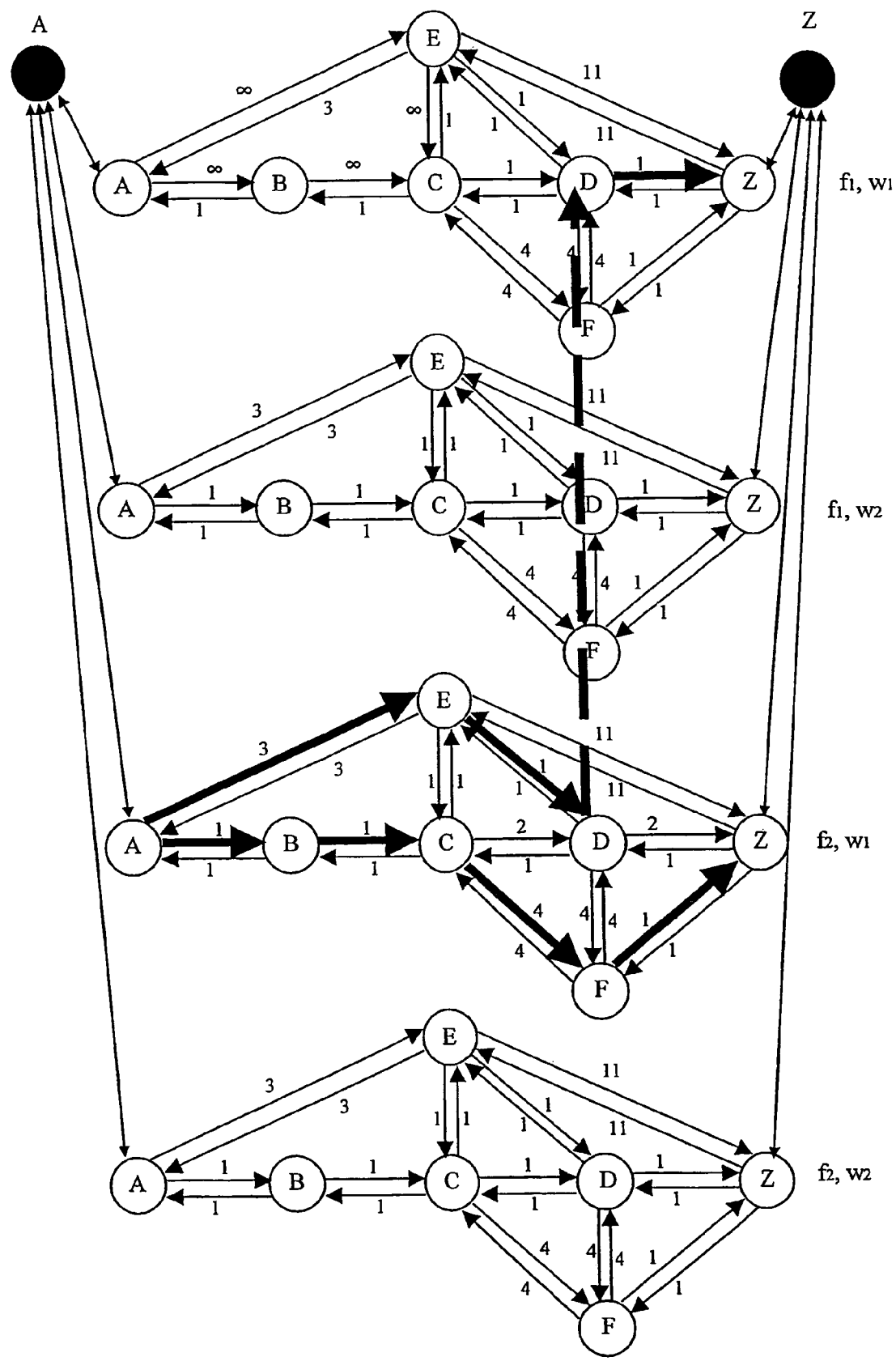

FIG. 6e shows such reconstruction of the pair of paths in the layered graph. It has to be noticed that the jump from layer ($f_2$, $w_1$) to layer ($f_1$, $w_1$) in node D is permitted in a WP network using a vertical arc, as it corresponds to only fiber switching, with no wavelength conversion. Further, as it can be seen, the two paths are edge-disjoint. One of the two paths can be labeled as "working" and the other as "spare".

Case 2: VWP Network—Edge-disjoint

In a VWP network all the nodes have wavelength conversion capability. Thus, each lightpath (working or spare) associated to a connection request may use more than one wavelength.

Figure 7A:
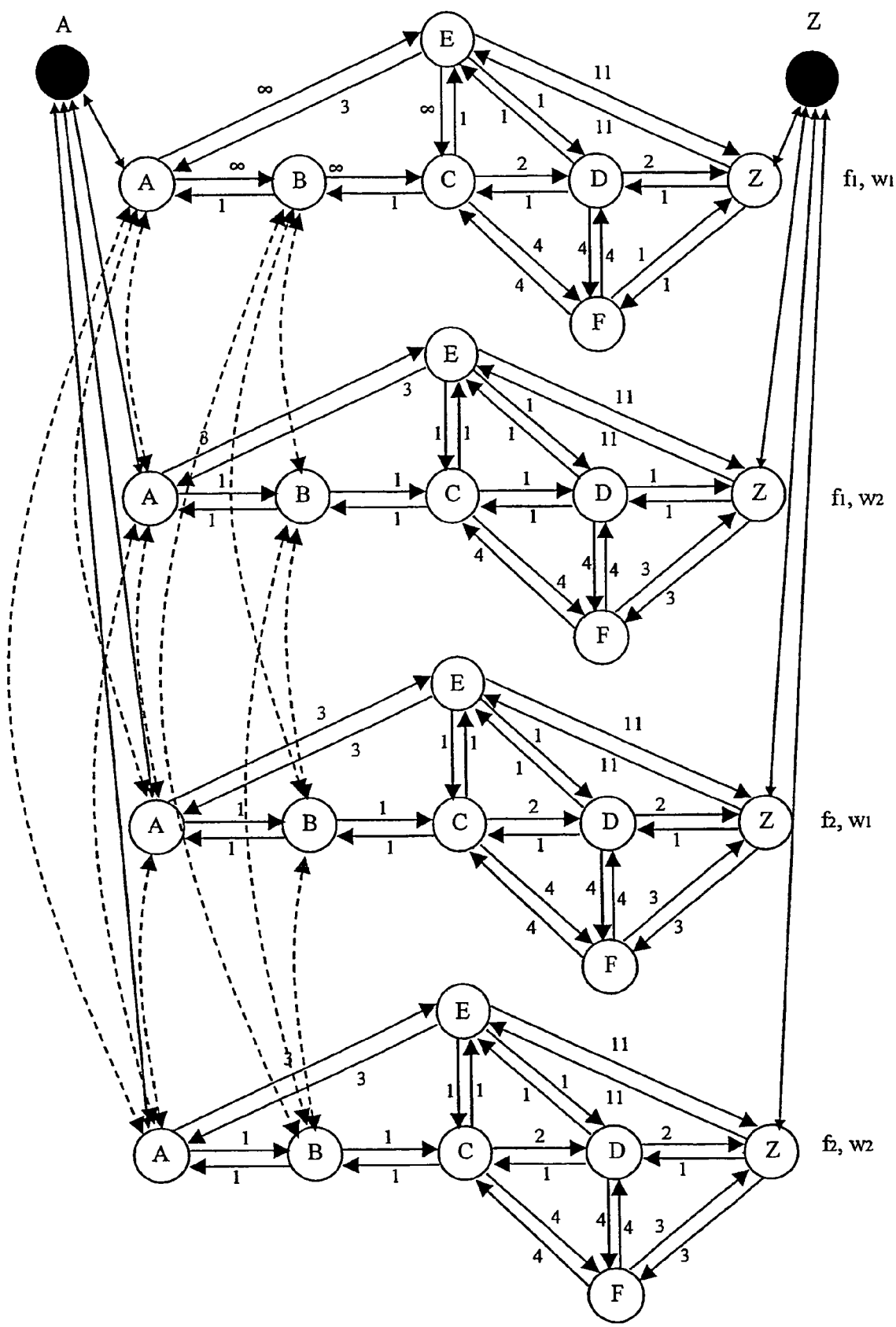
FIGS. 7a-b-c-d-e-f show the adaptation of a Bhandari algorithm on a layered graph representing a VWP network having the topology of FIG. 5, in order to find a pair of edge- or vertex-disjoint working-spare paths.

FIG. 7a shows the layered graph representing the network of FIG. 5 in this case. Differently for the WP case, bidirectional vertical arcs connect corresponding image nodes with each other in all the layers, representing both the possibility of wavelength conversion and of fiber switching in each node. For the sake of simplicity, in FIG. 7a only the vertical arcs connecting corresponding image nodes A and B have been shown. However, it has to be intended that similar arcs should connect with each other all the corresponding nodes in all the layers. "Oblique" arcs are still forbidden. For the sake of simplicity, add-drop function was shown in FIG. 7a only for the two source-destination image nodes A-Z. This has not to be intended as limiting the invention, in that any of the nodes of the network may have add-drop capability or not.

Each horizontal arc has an assigned cost (or weight), that can be determined in accordance to what stated in the previous case. In the VWP case, the vertical arcs connecting corresponding image nodes laying in layers labeled with the same wavelength may be assumed to have a null cost, corresponding only to a fiber switching in each node. On the other hand, the vertical arcs connecting corresponding image nodes laying in layers labeled with different wavelengths may be assumed to have a cost different from zero, thus taking into account of the cost of wavelength converters. As already mentioned in the WP case, a cost different from zero can be also assigned for the vertical arcs representing fiber switching. Further, although not shown in FIG. 7a, a cost can be also assigned to the image nodes.

In FIG. 7a, a cost has been assigned to the horizontal arcs: such cost is represented by the numbers provided near each arc of the layered graph. As it can be seen, an infinite cost has been associated to the disjoint paths AEC and ABC in the layer labeled with the pair ($f_1$, $w_1$), representing an already allocated pair of working-spare paths between the nodes A and C. Although not shown in FIG. 7a, it will be assumed that all the vertical arcs connecting layers labeled by different wavelengths have a cost equal to one. This has not to be intended as limiting the invention. On the contrary, all the vertical arcs connecting layers labeled by equal wavelengths are assumed to have a cost equal to zero.

In order to allocate a connection request between the source node A and the destination node Z, that is, in order to find a pair of working-spare paths between A and Z, the following steps are performed.

Figure 7B:
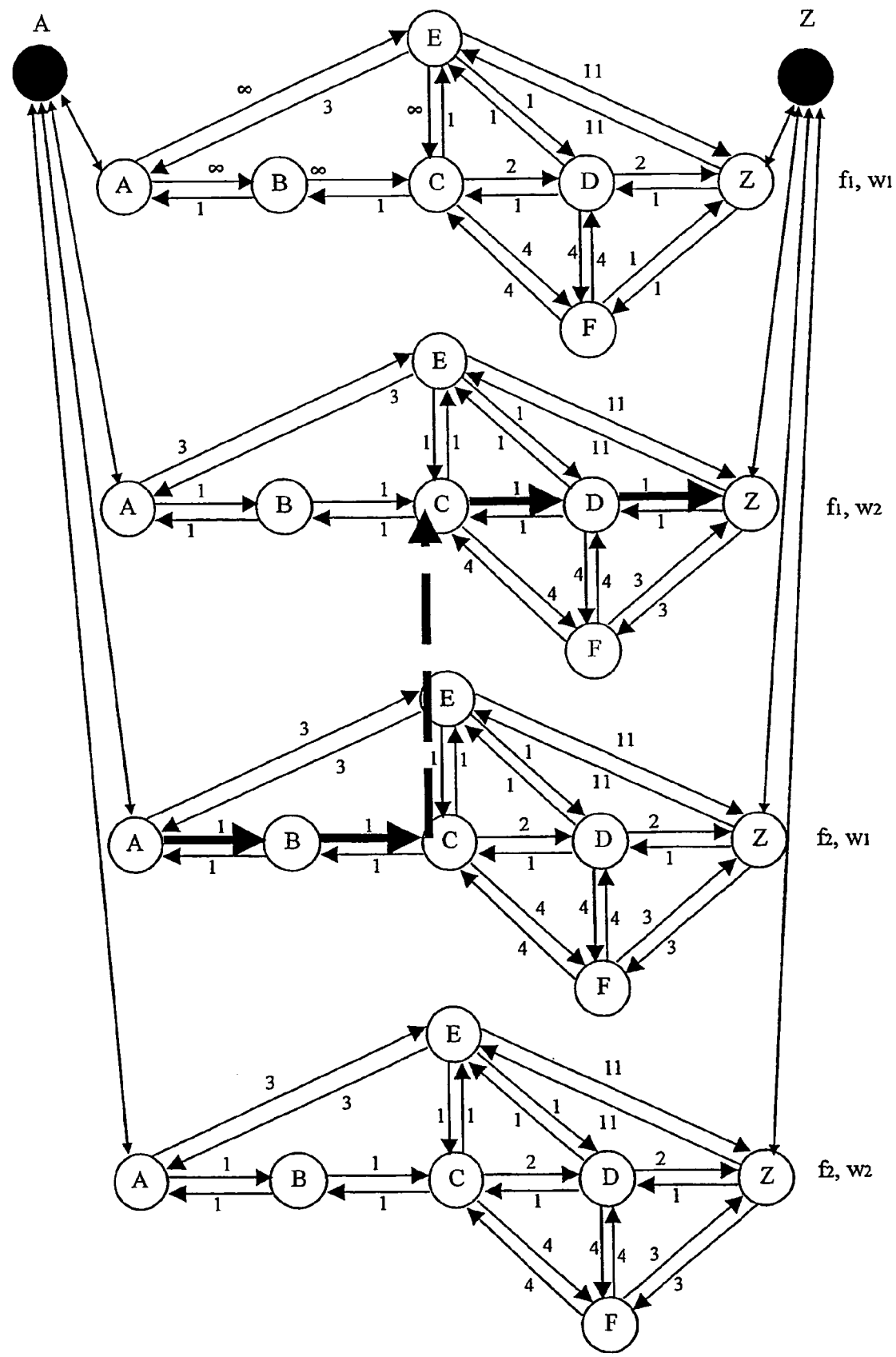

In a first step, a first shortest path is found in the layered graph between the nodes A and Z. For example, a Dijkstra algorithm can be applied in order to find the first shortest path. Another shortest path algorithm that can be applied is the BFS. However, the skilled in the art can choose another shortest path algorithm. FIG. 7b shows the first shortest path identified in the exemplary weighted layered graph according to FIG. 7a. In node C a fiber and wavelength switching is performed from fiber $f_2$ to fiber $f_1$ and from wavelength $w_1$ to wavelength $w_2$. In FIG. 7b vertical arcs have been removed for simplicity.

In a second step, the horizontal arcs belonging to the first shortest path, the corresponding arcs thereof in all the layers of the layered graph and the arcs having an orientation opposite to all these are removed from the layered graph. In other words, all the arcs representing the links traversed by the first shortest path are removed from the layered graph. The "removing" of an arc from the layered graph should correspond to rendering such arc forbidden for a subsequent path finding: thus, it may be accomplished either by effectively removing the arc by the layered graph or by assigning an infinite cost to the arc.

In a third step, the inverted horizontal arcs are introduced in the layered graph. In a VWP network, the inverted horizontal arcs are introduced in place of all the arcs removed in the second step. These inverted arcs have an orientation opposite with respect to that of the original arcs belonging to the first shortest path and a cost having the same absolute value and an opposite sign with respect to those of the respective original arcs belonging to the first shortest path.

The whole of the second and the third step provides, in the VWP case, a modified layered graph having inverted horizontal arcs in place of the horizontal arcs of the first shortest path and in place of the corresponding horizontal arcs thereof in all the layers.

It has to be noticed that the inverted horizontal arcs are introduced in all the layers of the layered graph, as in the VWP case the vertical arcs may connect all the corresponding image nodes in any layer.

Figure 7C:
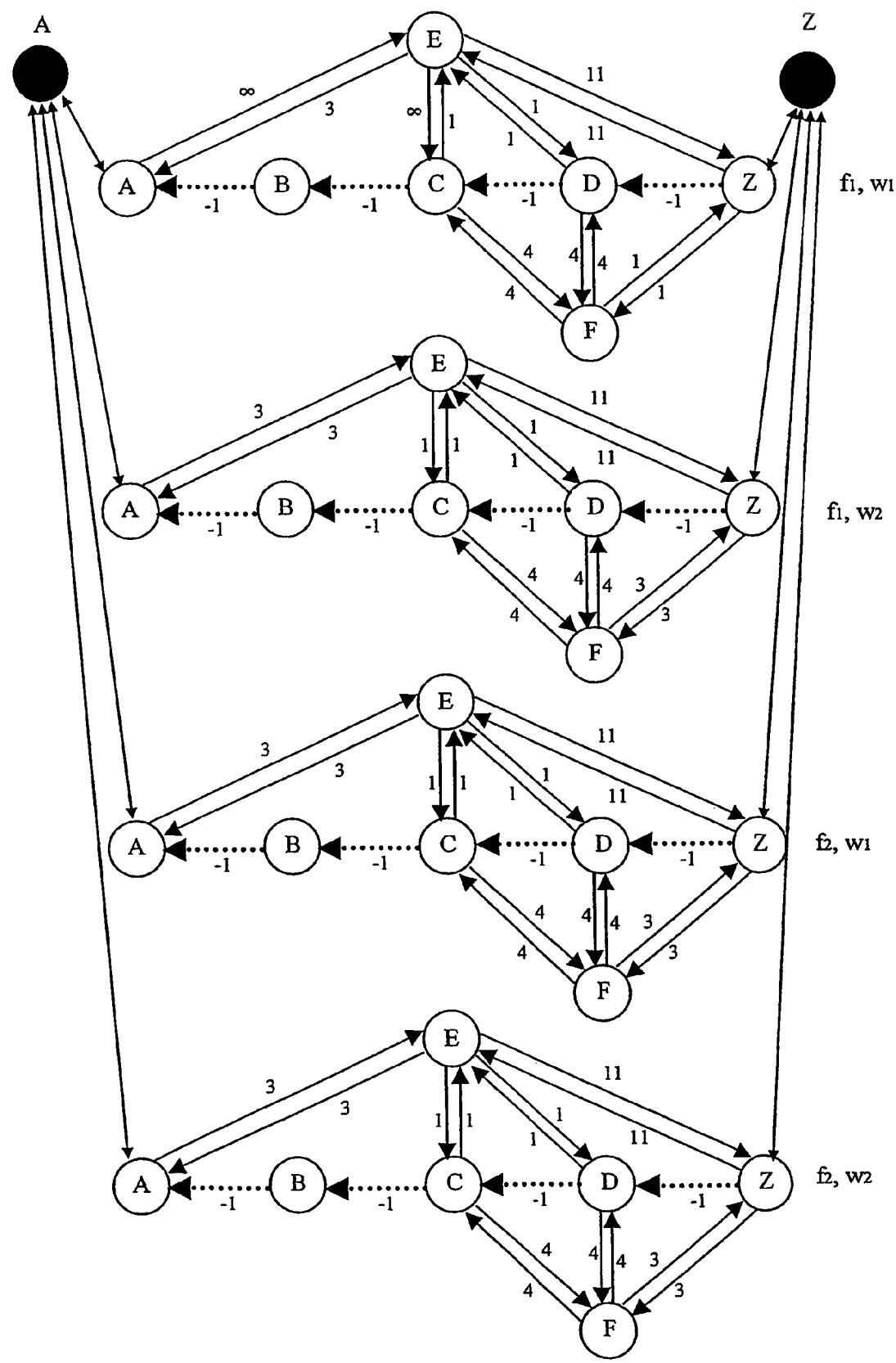

FIG. 7c shows the modified layered graph in the example under analysis. In FIG. 7c vertical arcs have been removed for simplicity. However, it has to be noticed that the vertical arcs possibly included in the first shortest path are not modified in the second and third step.

Figure 7D:
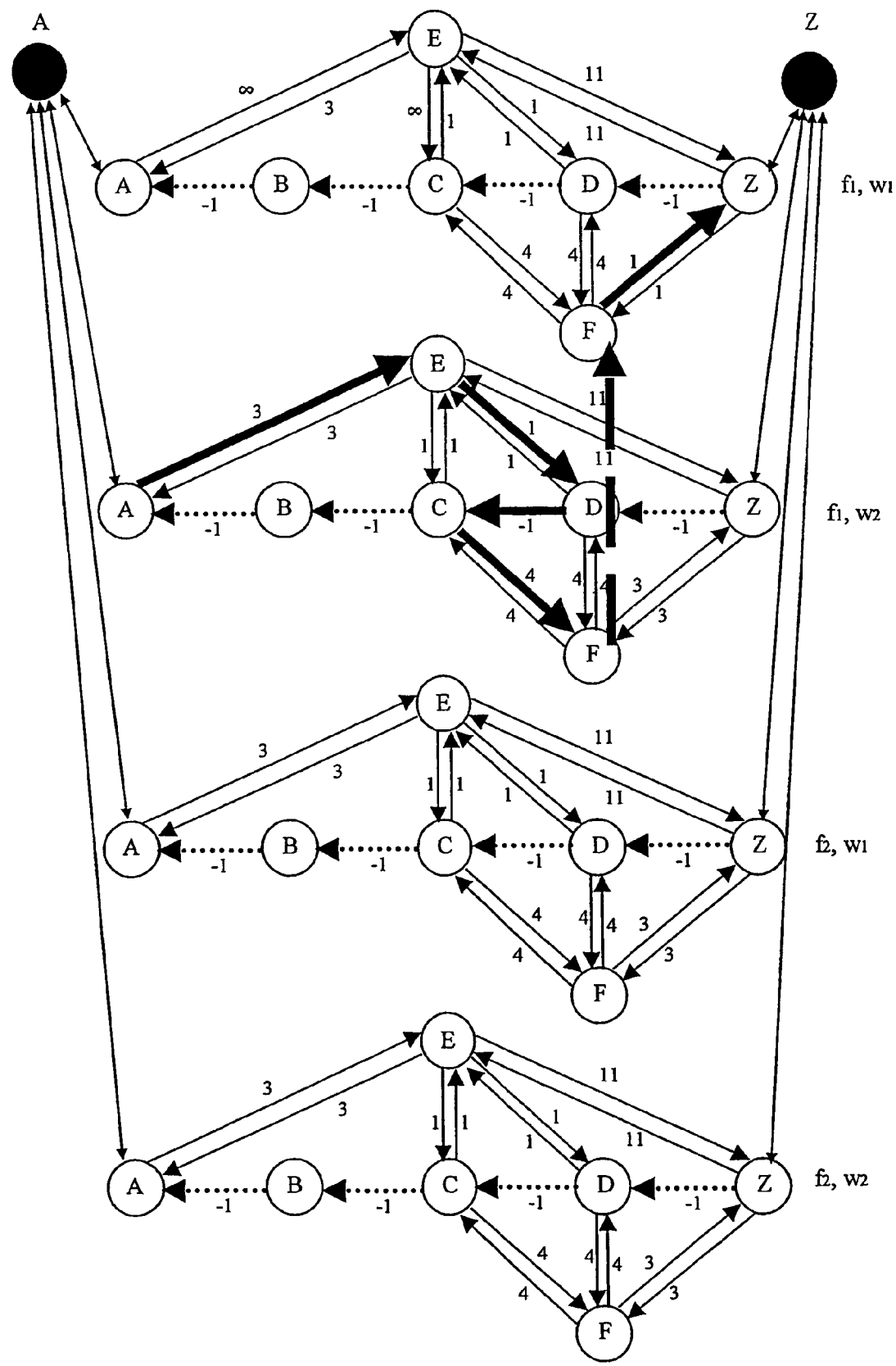

In a fourth step, a second shortest path is found in the modified layered graph between the nodes A and Z. For example, a modified Dijkstra algorithm can be applied in order to find the second shortest path. Another shortest path algorithm that can be applied for finding the second shortest path is the BFS algorithm. However, the skilled in the art can choose another algorithm suitable for finding a shortest path in a graph comprising negative weights or costs. FIG. 7d shows a second shortest path found in the modified layered graph of FIG. 7c, using a wavelength conversion in node F.

The first and the second shortest path may use co-linked horizontal arcs for example, by comparing FIG. 7b with FIG. 7d, the arcs linking the corresponding image nodes C and D used by the first shortest path and by the second shortest path in the layer ($f_1$, $w_2$) are co-linked. In a fifth step, the co-linked arcs are removed. Now, the original arcs of the original layered graph may be restored (both in orientation and cost). By grouping the remaining horizontal arcs belonging to the first and second shortest path it is possible to reconstruct a pair of paths in the layered graph, if necessary by the aid of suitable vertical arcs allowing linking between different layers. This pair of paths in the layered graph can be associated to the pair of edge-disjoint working-spare paths in the network of FIG. 5. In the considered example, the co-linked arcs removed are those linking node C with node D. Thus, the remaining arcs of the first shortest path are: AB and BC on layer ($f_2$, $w_1$), DZ on layer ($f_1$, $w_2$); the remaining arcs of the second shortest path are: AE, ED, CF, on layer ($f_1$, $w_2$) and FZ on layer ($f_1$, $w_1$). The reconstruction of two paths from source node A to destination node Z starting from such remaining arcs gives:
  a) AB→BC on layer ($f_2$, $w_1$)→CF on layer ($f_1$, $w_2$)→FZ on layer ($f_1$, $w_1$), with two wavelength conversions and one fiber switching;
  b) AE→ED→DZ on layer ($f_1$, $w_2$).

Figure 7E:
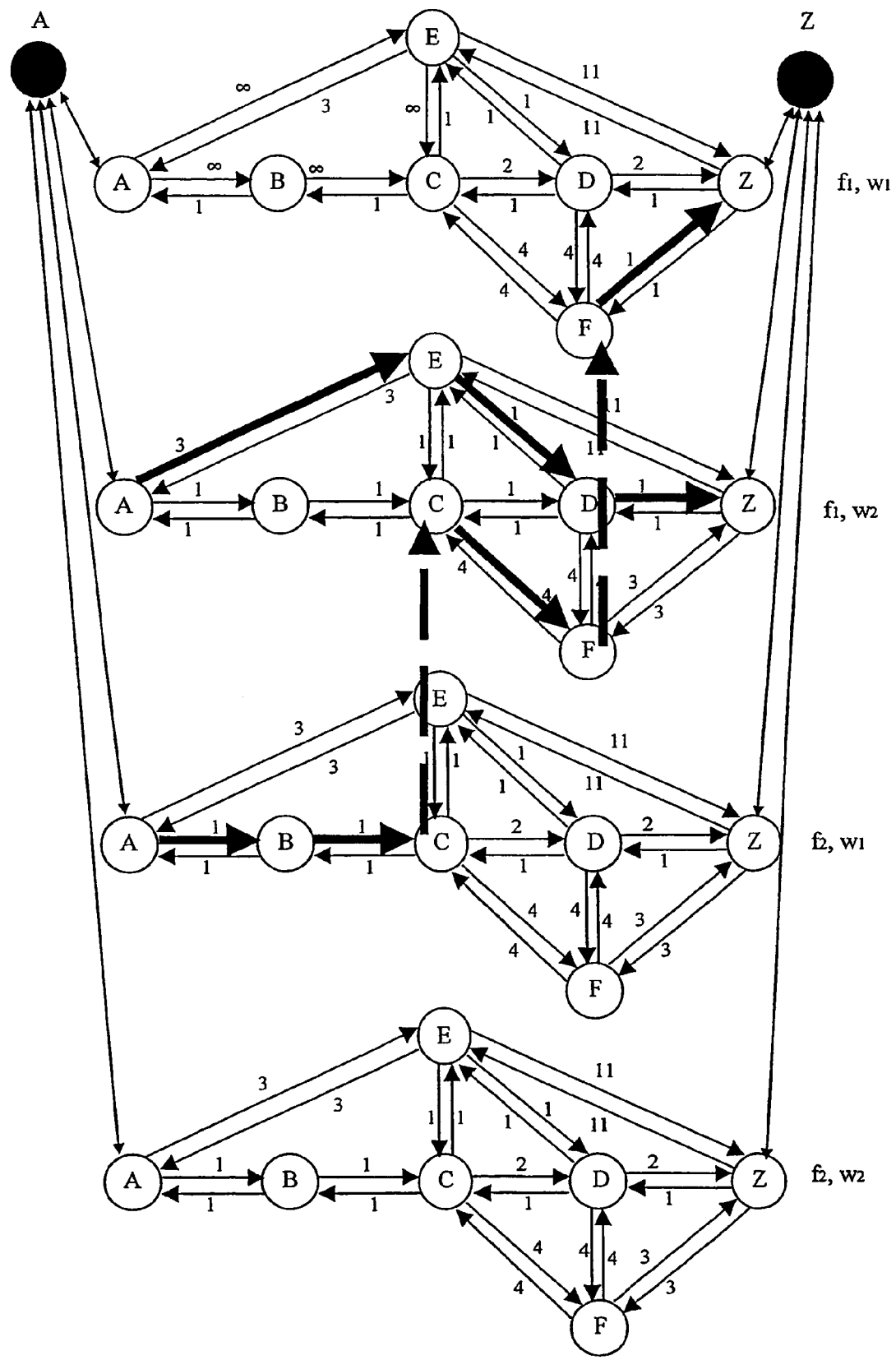

FIG. 7e shows such reconstruction of the pair of paths in the layered graph. As it can be seen, the two paths are edge-disjoint. One of the two paths can be labeled as "working" and the other as "spare".

Case 3: PVWP Network—Edge-disjoint

In a PVWP network only some of the nodes have wavelength conversion capability. Thus, a lightpath (working or spare) associated to a connection request may use more than one wavelength.

Figure 8A:
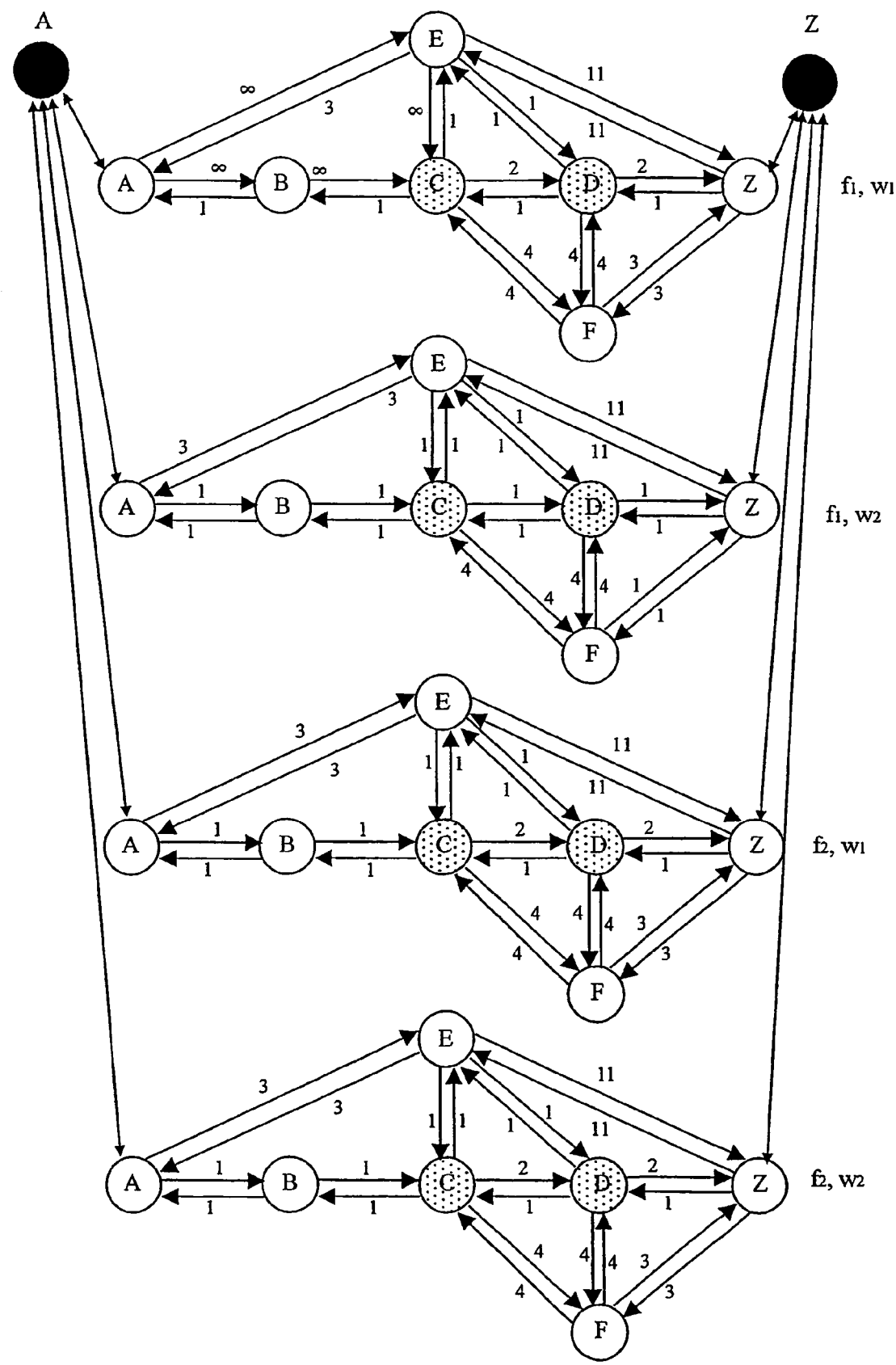
FIGS. 8a-b-c-d-e-f show the adaptation of a Bhandari algorithm on a layered graph representing a PVWP network having the topology of FIG. 5, in order to find a pair of edge- or vertex-disjoint working-spare paths.

FIG. 8a shows the layered graph representing the network of FIG. 5 in this case. For exemplary purposes, it is assumed that the two adjacent nodes C and D have wavelength conversion capability. These nodes have been highlighted with punctuation in FIG. 8a. Bidirectional vertical arcs have not been shown in FIG. 8a for simplicity. However, it has to be intended that bidirectional vertical arcs connect corresponding image nodes C and D with each other, respectively, in all the layers, representing both the possibility of wavelength conversion and of fiber switching. As far as the other nodes are concerned, bidirectional vertical arcs connect corresponding image nodes belonging to the layers labeled with the same wavelength and a different fiber, representing the capability of fiber switching. "Oblique" arcs are still forbidden. For the sake of simplicity, add-drop function was shown in FIG. 8a only for the two source-destination image nodes A-Z. This has not to be intended as limiting the invention, in that any of the nodes of the network may have add-drop capability or not.

Each horizontal arc has an assigned cost (or weight), that can be determined in accordance to what stated in the previous cases. In particular, the vertical arcs connecting corresponding image nodes laying in layers labeled with the same wavelength may be assumed to, have a null cost, corresponding only to a fiber switching in each node. On the other hand, the vertical arcs connecting corresponding image nodes laying in layers labeled with different wavelengths may be assumed to have a cost different from zero, thus taking into account of the cost of wavelength converters. As in case 1 or case 2, a cost different from zero can be also assigned for the vertical arcs representing fiber switching. Further, although not shown in FIG. 8a, a cost can be also assigned to the image nodes.

In FIG. 8a, a cost has been assigned to the horizontal arcs: such cost is represented by the numbers provided near each arc of the layered graph. As it can be seen, an infinite cost has been associated to the disjoint paths AEC and ABC in the layer labeled with the pair ($f_1$, $w_1$), representing an already allocated pair of working-spare paths between the nodes A and C. Further, it will be assumed that all the vertical arcs connecting image nodes laying in layers labeled by different wavelengths have a cost equal to one. On the contrary, all the vertical arcs connecting layers labeled by equal wavelengths are assumed to have a cost equal to zero.

In order to allocate a connection request between the source node A and the destination node Z, that is, in order to find a pair of working-spare paths between A and Z, the following steps are performed.

Figure 8B:
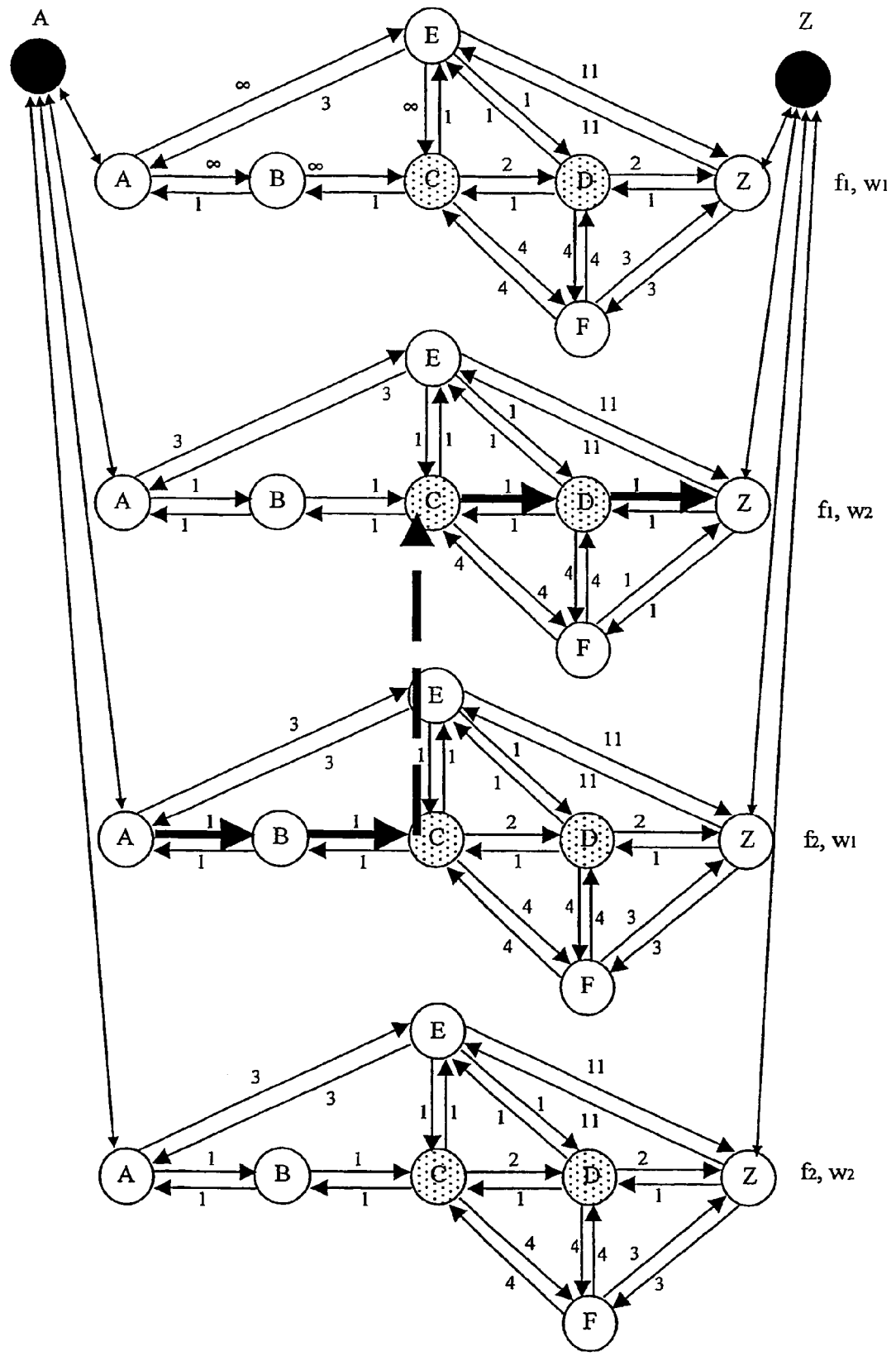

In a first step, a first shortest path is found in the layered graph between the nodes A and Z. For example, a Dijkstra algorithm can be applied in order to find the first shortest path. Another shortest path algorithm that can be applied is the BFS. However, the skilled in the art can choose another shortest path algorithm. FIG. 8b shows the first shortest path identified in the exemplary weighted layered graph according to FIG. 8a. In node C a fiber and wavelength switching is performed from fiber $f_2$ to fiber $f_1$ and from wavelength $w_1$ to wavelength $w_2$.

In a second step, the horizontal arcs belonging to the first shortest path, the corresponding arcs in all the layers of the layered graph thereof and the arcs having an orientation opposite to all these are removed from the layered graph. In other words, all the arcs representing the links traversed by the first shortest path are removed from the layered graph. The "removing" of an arc from the layered graph should correspond to rendering such arc forbidden for a subsequent path finding: thus, it may be accomplished either by effectively removing the arc by the layered graph or by assigning an infinite cost to the arc.

In a third step, the inverted horizontal arcs are introduced in the layered graph. In a PVWP network, the inverted horizontal arcs are introduced in place of some of the arcs removed in the second step. In particular, they are introduced:

a) between the image nodes crossed by the first shortest path; and
b) between the corresponding image nodes thereof laying in layers labeled by the wavelength used in the first shortest path; and
c) if the first shortest path crosses at least one pair of adjacent nodes having wavelength conversion capability, between the corresponding adjacent image nodes in all the layers.

Thus, in the PVWP case, a sort of "mixing-rule" between the two previous cases is performed. In fact, if the first shortest path crosses only pairs of adjacent image nodes having wavelength conversion capability the same rule of VWP case applies; if the first shortest path does not cross any pair of adjacent nodes having wavelength conversion capability the same rule of WP case applies.

The inverted arcs have an orientation opposite with respect to that of the respective original arcs belonging to the first shortest path and a cost having the same absolute value and an opposite sign with respect to those of the original arcs belonging to the first shortest path.

Equivalently, the step of introducing the inverted horizontal arcs may precede the step of removing the horizontal arcs of the first shortest path and corresponding arcs thereof. In such case, only the corresponding horizontal arcs which have not been subjected to inversion are removed.

In any case, the whole of the second and the third step provides, in the PVWP case, a modified layered graph having: a) inverted horizontal arcs in place of the horizontal arcs of the first shortest path and in place of the corresponding horizontal arcs thereof laying in layers labeled by the wavelength used in the first shortest path (respectively in each horizontal arc); b) possible inverted horizontal arcs between pairs of image nodes corresponding to pairs of adjacent nodes having wavelength conversion capability, crossed by the first shortest path, in all the layers; c) no horizontal arcs in place of possible horizontal arcs corresponding to the horizontal arcs of the first shortest path, but laying in layers labeled by wavelengths not used by the first shortest path, if the image nodes at the ends of these corresponding horizontal arcs do not represent nodes of the network having wavelength conversion capability.

It has to be noticed that the inverted horizontal arcs are introduced between any pair of image nodes corresponding to a respective pair of image nodes crossed by the first shortest path, but connected with the image nodes crossed by the first shortest path by vertical arcs.

Figure 8C:
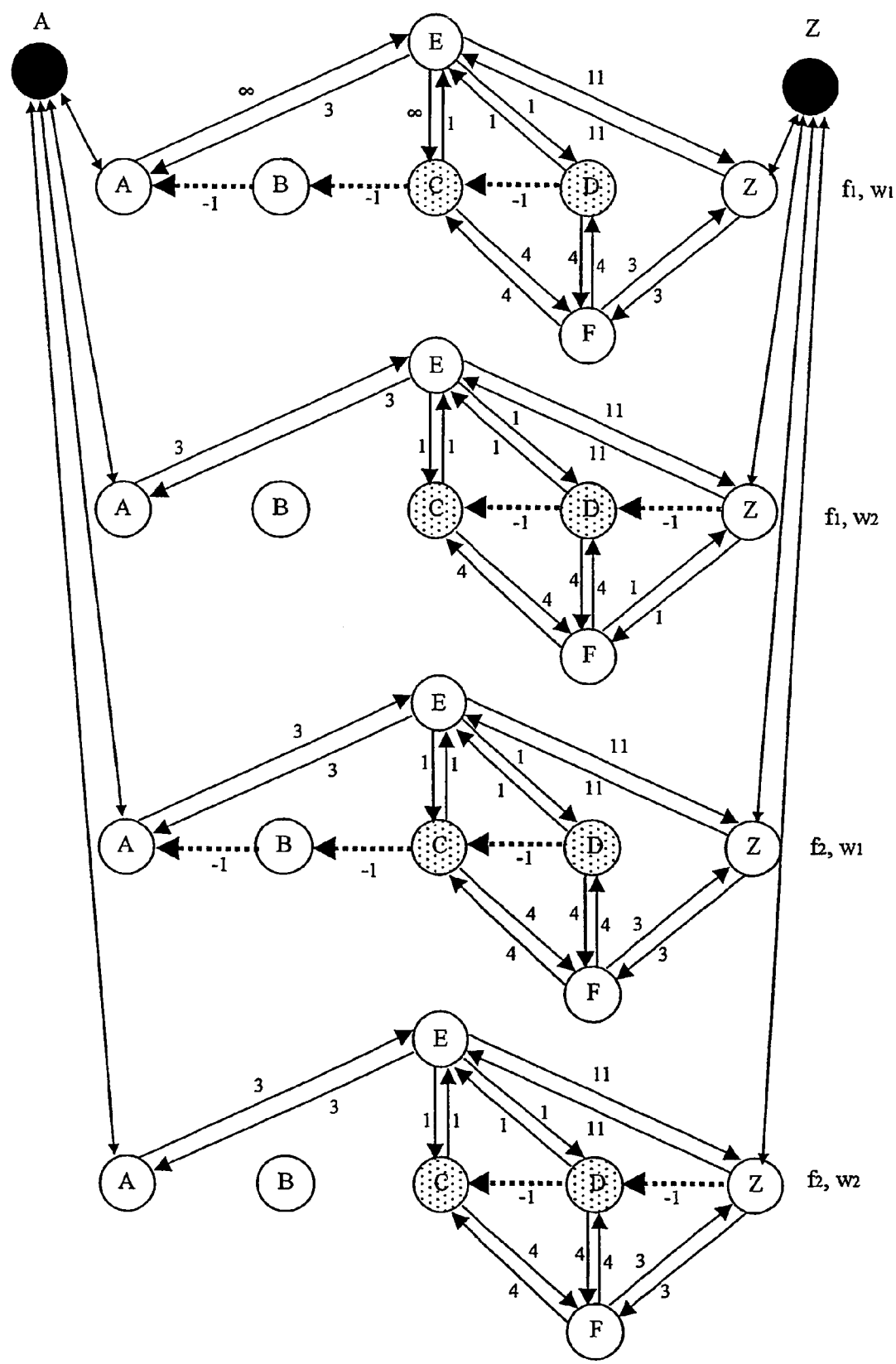

FIG. 8c shows the modified layered graph resulting from the application of the second and third step in the example under analysis. In FIG. 8c vertical arcs have been removed for simplicity. However, it has to be noticed that the vertical arcs possibly included in the first shortest path are not modified in the second and third step.

Figure 8D:
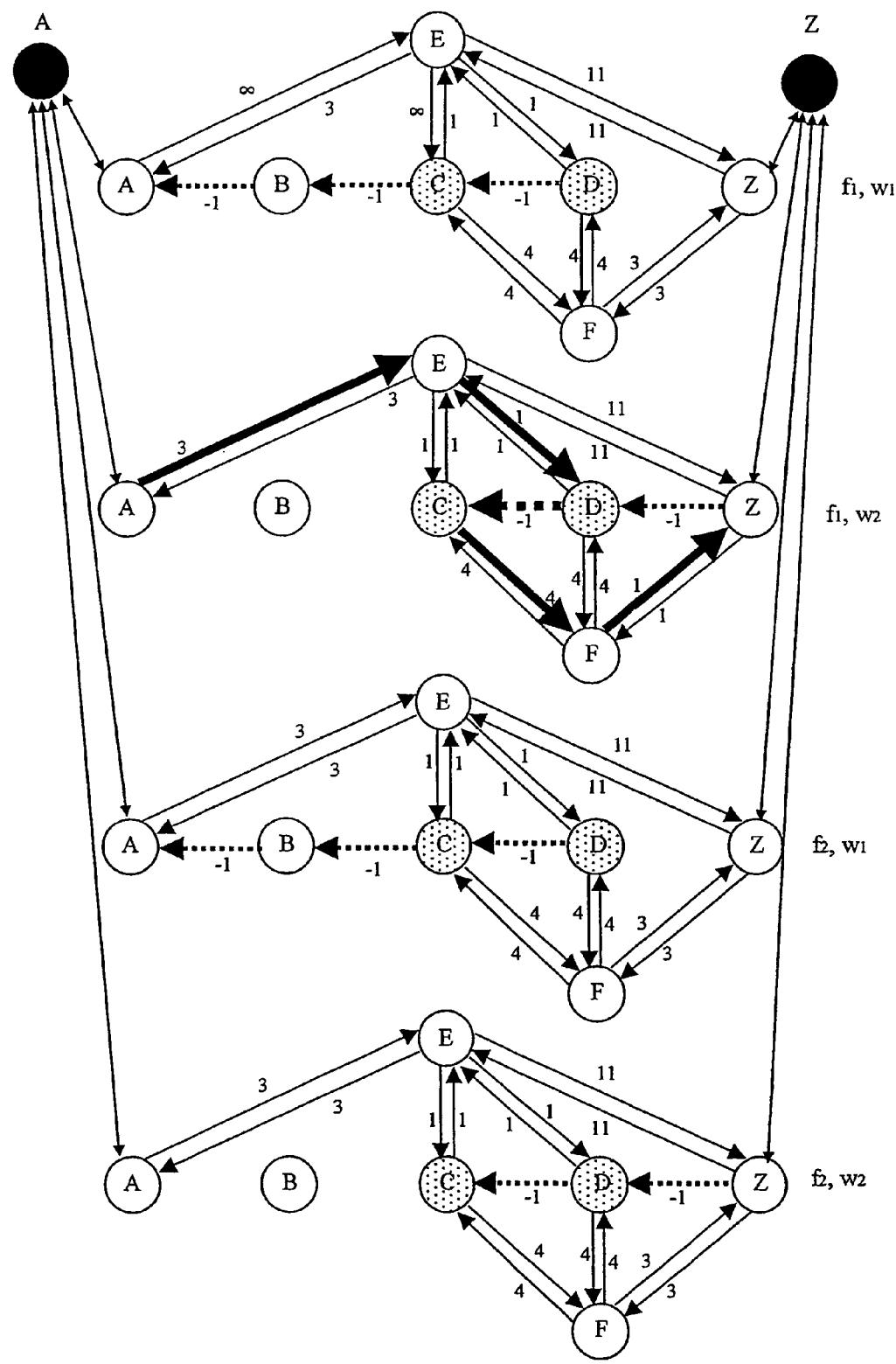

In a fourth step, a second shortest path is found in the modified layered graph between the nodes A and Z. For example, a modified Dijkstra algorithm can be applied in order to find the second shortest path. Another shortest path algorithm that can be applied for finding the second shortest path is the BFS algorithm. However, the skilled in the art can choose another algorithm suitable for finding a shortest path in a graph comprising negative weights or costs. FIG. 8d shows a second shortest path found in the modified layered graph of FIG. 8c.

The first and the second shortest path may use co-linked horizontal arcs. For example, by comparing FIG. 8b with FIG. 8d, the arcs linking the corresponding image nodes C and D used by the first shortest path and by the second shortest path in the layer $(f_1, w_2)$ are co-linked. In a fifth step, the co-linked arcs are removed. Now, the original arcs of the original layered graph may be restored (both in orientation and cost). By grouping the remaining horizontal arcs belonging to the first and second shortest path it is possible to reconstruct a pair of paths in the layered graph, if necessary by the aid of suitable vertical arcs allowing linking between different layers. This pair of paths in the layered graph can be associated to the pair of edge-disjoint working-spare paths in the network of FIG. 5. In the considered example, the co-linked arcs removed are those linking node C with node D. Thus, the remaining arcs of the first shortest path are: AB and BC on layer $(f_2, w_1)$, DZ on layer $(f_1, w_2)$; the remaining arcs of the second shortest path are: AE, ED, CF, FZ on layer $(f_1, w_2)$. The reconstruction of two paths from source node A to destination node Z starting from such remaining arcs gives:

a) AB→BC on layer $(f_2, w_1)$→CF→FZ on layer $(f_1, w_2)$, with one wavelength conversion and fiber switching in node C;
b) AE→ED→DZ on the layer $(f_1, w_2)$.

Figure 8E:
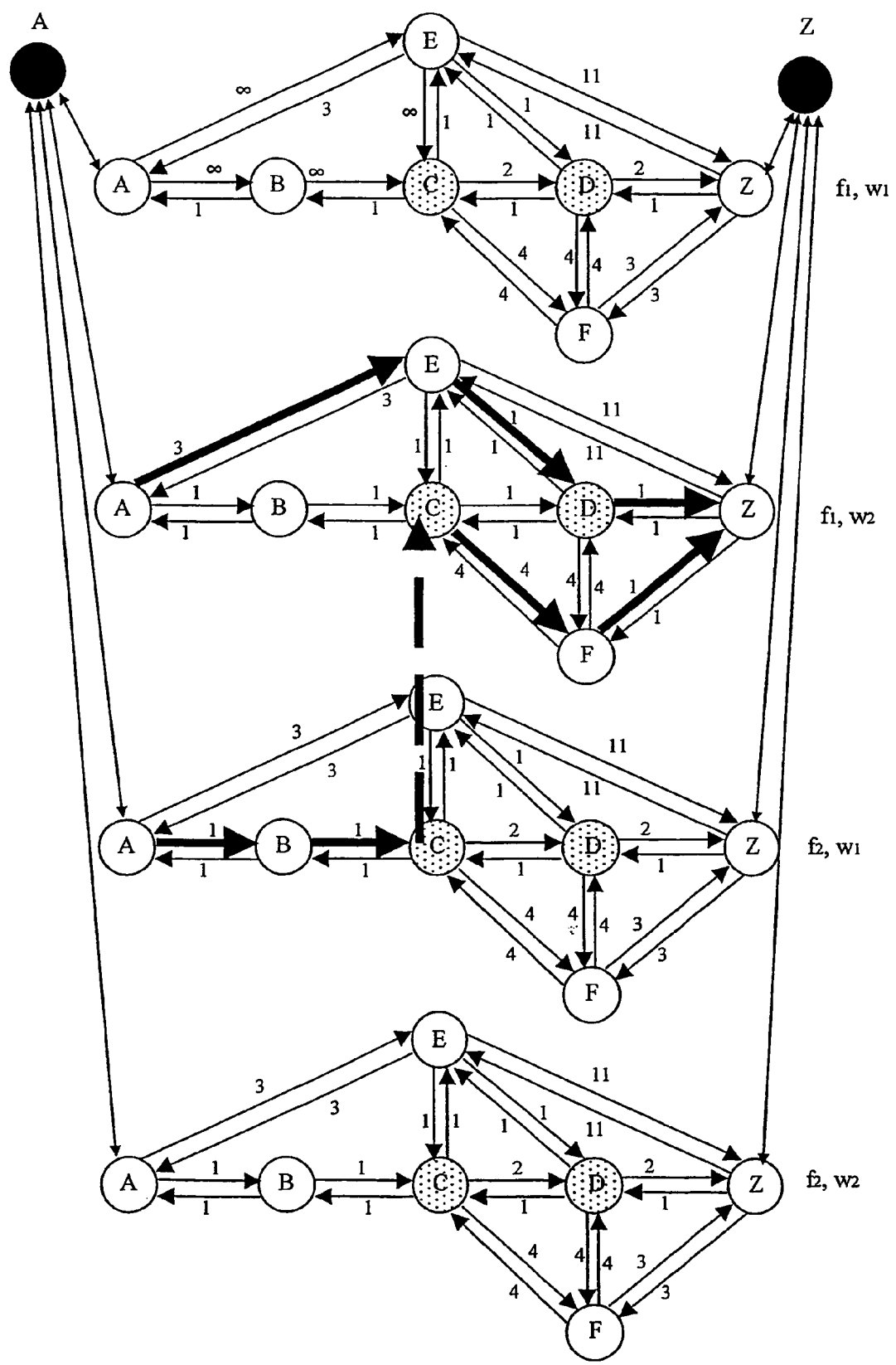

FIG. 8e shows such reconstruction of the pair of paths in the layered graph. As it can be seen, the two paths are edge-disjoint. One of the two paths can be labeled as "working" and the other as "spare".

Case 4: WP Network—Vertex-disjoint

The algorithm for finding vertex-disjoint pairs of paths on the layered graph is analog to the algorithm for finding edge-disjoint pair of paths in the first step. A first shortest path has to be found on the layered graph, once the costs of the arcs have been assigned. FIGS. 6a-b may thus still be taken as starting point in the WP case. Then, the horizontal arcs belonging to the first shortest path and corresponding arcs in all the layers thereof can be removed, as in previous case 1.

Differently from case 1, in a first sub-step the layered graph is modified so that at least each image node crossed by the first shortest path (except the source and the destination nodes) and the corresponding image nodes thereof in all the layers are split in two. The second, split image node of each "original" image node will be referred as "dummy" image node. The original image node and the dummy image node are connected with each other by a horizontal arc having a null cost oriented from the dummy node to the original node. In the example considered, as the shortest path found in FIG. 6b crosses nodes B, C and D, these are the nodes to be split (and corresponding nodes in all the layers thereof). The dummy image nodes will be denoted with a prime (B', C', D') in order to distinguish them from the image original nodes.

It is possible that some or all of the nodes subjected to splitting were originally connected, by means of pairs of horizontal arcs oriented opposite with each other, with other nodes not crossed by the first shortest path, in each layer. For example, both node C and node D were connected with both node E and node F (differently from node B, which was not connected to other nodes than those crossed by the first shortest path). As far as these pairs of horizontal arcs, they are reorganized after node splitting so that one of the two arcs is connected to the original node and the other one is connected to the dummy node. The orientation of the two arcs is chosen so that, together with the arc having null cost oriented from the dummy node to the original node, the formation of a cycle is avoided between the original node, the dummy node and the "external" node not crossed by the first shortest path.

Figure 6F:
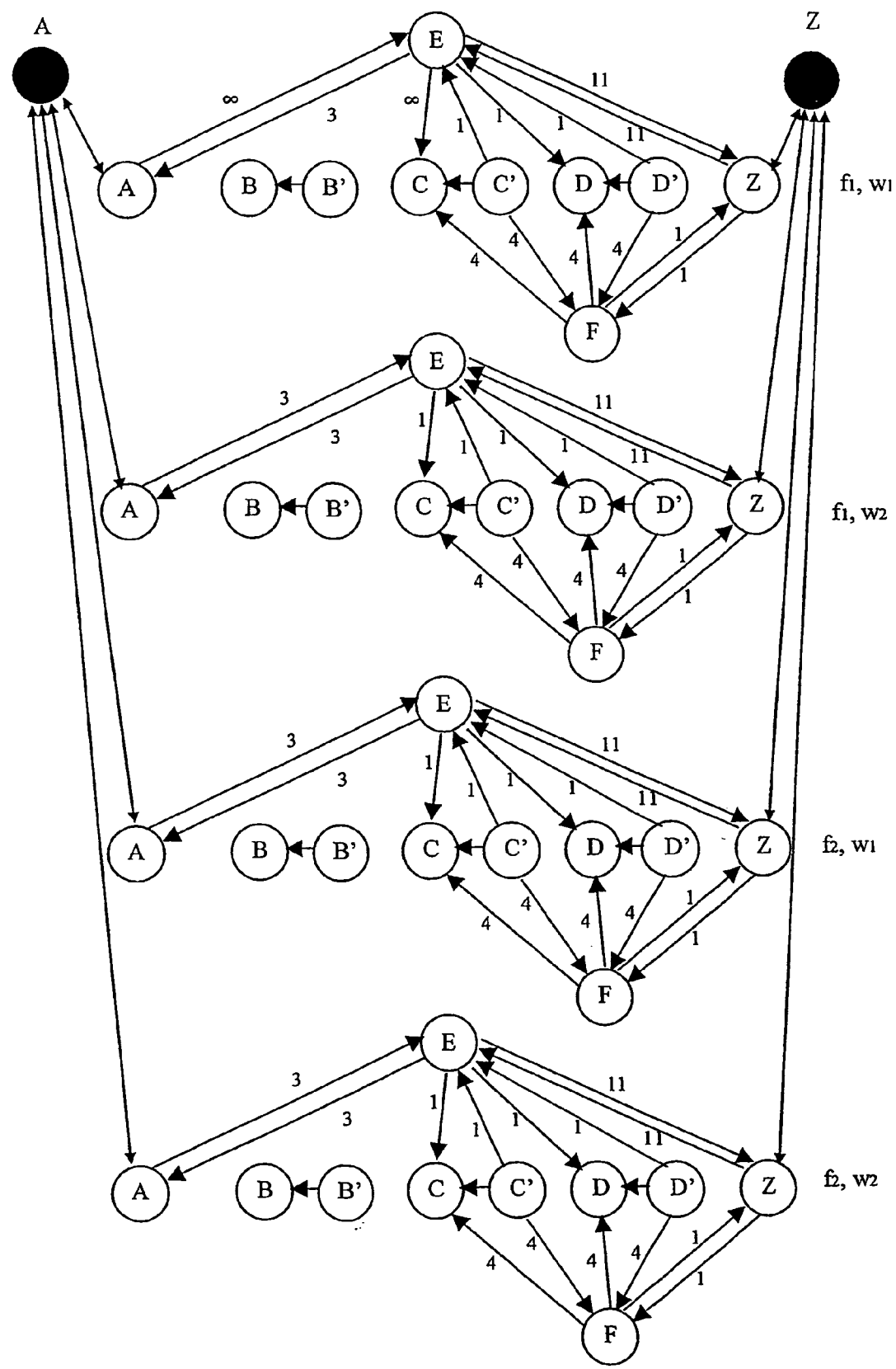

FIG. 6f shows the layered graph after the removing of the horizontal arcs belonging to the first shortest path and corresponding arcs in all the layers thereof and after the introduction of the dummy image nodes.

Bidirectional vertical arcs may be left unchanged in the splitting-node sub-step. Thus, they continue to connect corresponding original image nodes as in previous case 1, while no vertical arc connects corresponding dummy nodes.

In order to introduce the inverted horizontal arcs, the presence of the dummy image nodes has to be taken into account. As in case 1, inverted horizontal arcs are introduced in place of the removed arcs in the layers labeled by the same wavelength used by the first shortest path and have a cost with the same absolute value but the opposite sign of the cost of the respective arcs belonging to the first shortest path. Differently from case 1, they are introduced so as to connect with an oriented arc each node crossed by the first shortest path with the dummy of its previous one on the first shortest path, starting from the destination node. Thus, in the example considered, node Z is connected to dummy node D', node D is connected to the dummy node C', node C is connected to the dummy node B'. As source node A was not split, node B is connected to node A. This step is done, as said, in the layers labeled by the same wavelength used by the first shortest path.

After the introduction of the inverted horizontal arcs, a modified layered graph is obtained. As in previous cases, equivalently, the step of introducing the inverted horizontal arcs may precede the step of removing the horizontal arcs of the first shortest path and corresponding arcs thereof.

Figure 6G:
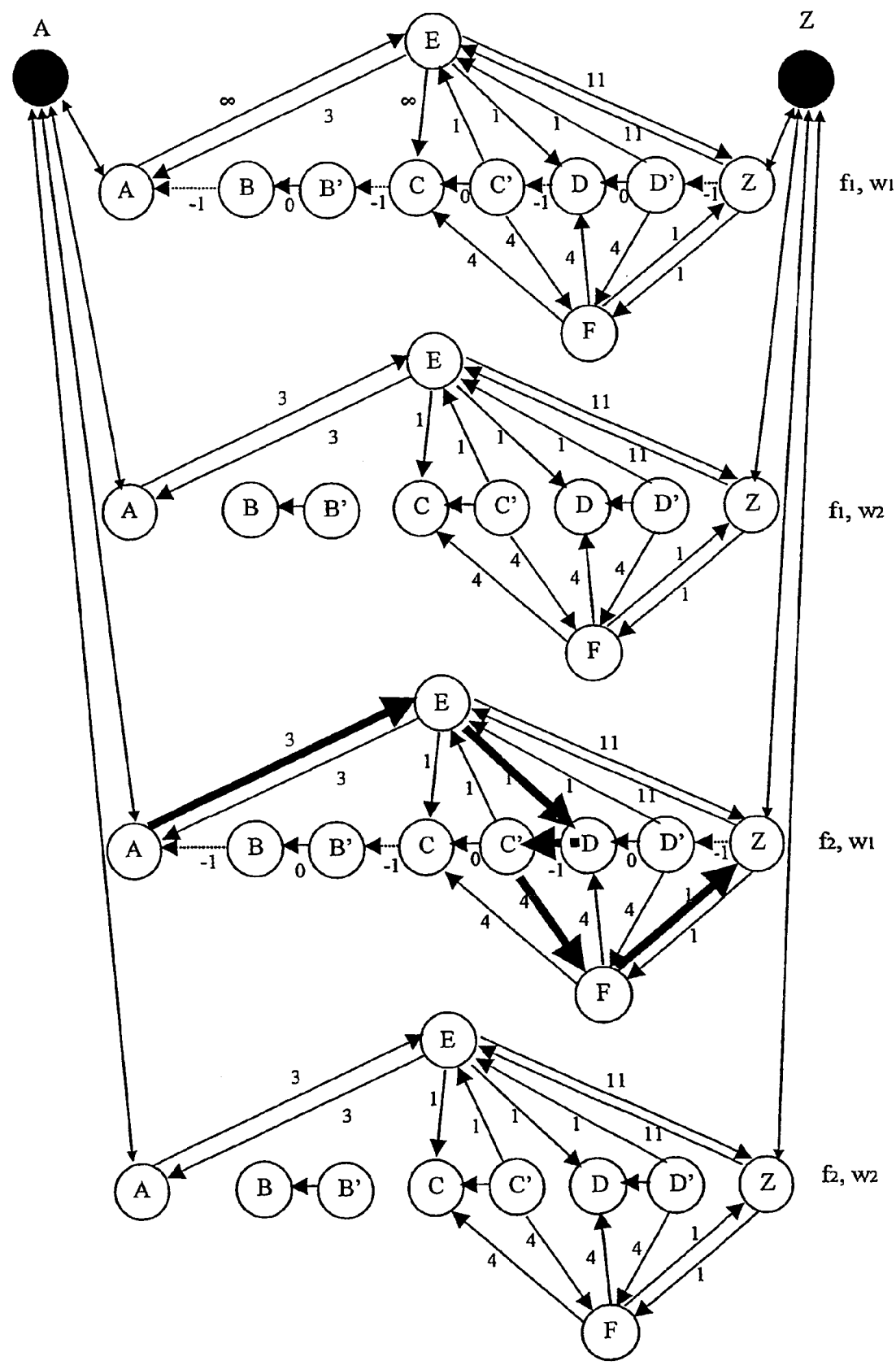

Then, the algorithm proceeds as in case 1, by finding a second shortest path on the modified layered graph. FIG. 6g shows the second shortest path. As it can be seen, such second shortest path is similar to that obtained in case 1 (see FIG. 6d), the only difference being in the passage through the dummy node C'.

From a practical point of view, if a pair of node-disjoint paths has to be found, image dummy nodes could be introduced at the beginning in the layered graph for each image node. In other words, the network can be initially represented by a layered graph in which each image node has a dummy node, connected only to its original node with a horizontal arc oriented from the dummy to the original node. Then, when needed, the required connections between the dummy nodes and the other nodes can be suitably built, according to what stated before.

After the step of finding the second shortest path, the image dummy nodes are coalesced with the original image nodes in all the layers. This coalescing sub-step may be performed in any suitable way, for example by removing the dummy nodes and the arcs having null cost, and by restoring the connections of the other horizontal arcs with the original nodes, or by simply disconnecting the arcs having a cost different from zero connected to the dummy nodes and connecting the same to the original node (thus leaving the arcs having null cost between the dummy nodes and the original nodes).

After the coalescing sub-step, the algorithm proceeds in the same way of case 1, by removing the co-linked horizontal arcs, by restoring the orientation and the cost of the inverted oriented arcs and by building the pair of paths by using the remaining horizontal arcs of the first and of the second shortest path, if necessary by using suitable connecting vertical arcs. For these steps, reference can be made to FIG. 6e. In fact, the edge-disjoint pair of paths found in case 1 is actually also a vertex-disjoint pair.

Case 5: VWP Network—Vertex-disjoint

The algorithm for finding vertex-disjoint pairs of paths on the layered graph is initially analog to the algorithm for finding edge-disjoint pair of paths in the first step. A first shortest path has to be found on the layered graph, once the costs of the arcs have been assigned. FIGS. 7a-b may thus still be taken as starting point in the VWP case. Then, the horizontal arcs belonging to the first shortest path and corresponding arcs in all the layers thereof can be removed, as in previous case 2.

Differently from case 2, in a first sub-step the layered graph is modified so that at least each image node crossed by the first shortest path (except the source and the destination nodes) and the corresponding image nodes thereof in all the layers are split in an original image node and in a dummy image node. The original image node and the dummy image node are connected with each other by a horizontal arc having a null cost oriented from the dummy node to the original node. In the example considered, as the shortest path found in FIG. 7b crosses nodes B, C and D, these are the nodes to be split (and corresponding nodes in all the layers thereof).

As far as the connections between the image nodes, the dummy nodes and the nodes not crossed by the first shortest path are concerned, reference can be made to what stated in case 4.

Bidirectional vertical arcs may be left unchanged in the splitting-node sub-step. Thus, they continue to connect corresponding original image nodes as in previous case 2, while no vertical arc connects corresponding dummy nodes.

In order to introduce the inverted horizontal arcs, the presence of the dummy image nodes has to be taken into account. As in case 2, inverted horizontal arcs are introduced in place of the removed arcs in all layers. They have a cost with the same absolute value but the opposite sign of the cost of the respective removed arcs belonging to the first shortest path. Differently from case 2, they are introduced so as to connect with an oriented arc each node crossed by the first shortest path with the dummy of its previous one on the first shortest path, starting from the destination node. Thus, in the example considered, node Z is connected to dummy node D', node D is connected to the dummy node C', node C is connected to the dummy node B'. As source node A was not split, node B is connected to node A.

After the introduction of the inverted horizontal arcs, a modified layered graph is obtained. As in previous cases, equivalently, the step of introducing the inverted horizontal arcs may precede the step of removing the horizontal arcs of the first shortest path and corresponding arcs thereof.

Figure 7F:
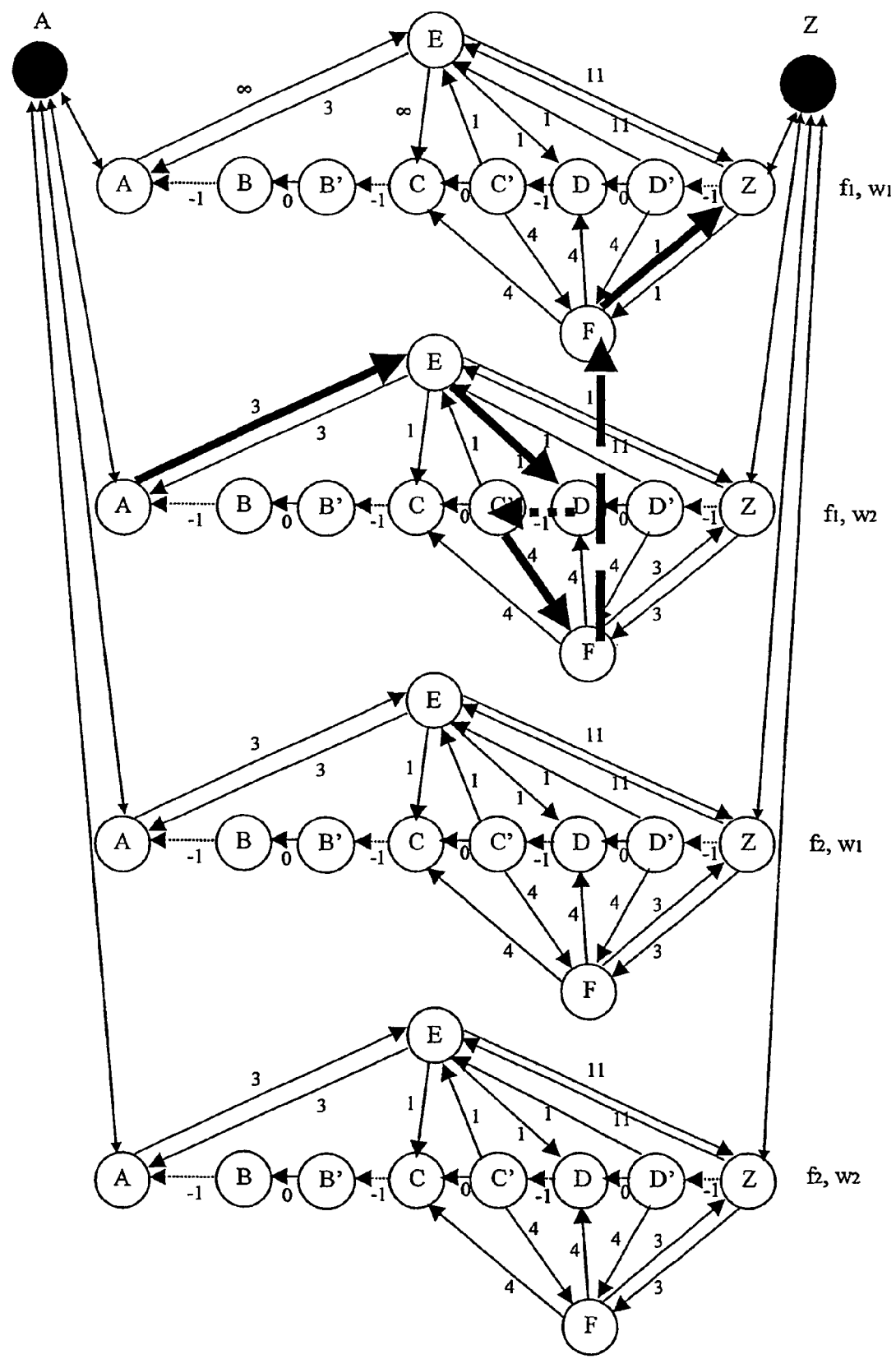

Then, the algorithm proceeds as in case 2, by finding a second shortest path on the modified layered graph. FIG. 7f shows the modified layered graph and the second shortest path. As it can be seen, such second shortest path is similar to that obtained in case 2 (see FIG. 7d), the only difference being in the passage through the dummy node C'.

After the step of finding the second shortest path, the image dummy nodes are coalesced with the original image nodes in all the layers. This coalescing sub-step may be performed in any suitable way, for example by removing the dummy nodes and the arcs having null cost, and by restoring the connections of the other horizontal arcs with the original nodes, or by simply disconnecting the arcs having a cost different from zero connected to the dummy nodes and connecting the same to the original node (thus leaving the arcs having null cost between the dummy nodes and the original nodes).

After the coalescing sub-step, the algorithm proceeds in the same way of case 2, by removing the co-linked horizontal arcs, by restoring the orientation and the cost of the inverted oriented arcs and by building the pair of paths by using the remaining horizontal arcs of the first and of the second shortest path, if necessary by using suitable connecting vertical arcs. For these steps, reference can be made to FIG. 7e. In fact, the edge-disjoint pair of paths found in case 2 is actually also a vertex-disjoint pair.

Case 6: PVWP Network—Vertex-disjoint

The algorithm for finding vertex-disjoint pairs of paths on the layered graph is initially analog to the algorithm for finding edge-disjoint pair of paths in the first step. A first shortest path has to be found on the layered graph, once the costs of the arcs have been assigned. FIGS. 8a-b may thus still be taken as starting point in the PVWP case. Then, the horizontal arcs belonging to the first shortest path and corresponding arcs in all the layers thereof can be removed, as in previous case 3.

Differently from case 3, in a first sub-step the layered graph is modified so that at least each image node crossed by the first shortest path (except the source and the destination nodes) and the corresponding image nodes thereof in all the layers are split in an original image node and in a dummy image node. The original image node and the dummy image node are connected with each other by a horizontal arc having a null cost oriented from the dummy node to the original node. In the example considered, as the shortest path found in FIG. 8b crosses nodes B, C and D, these are the nodes to be split (and corresponding nodes in all the layers thereof).

As far as the connections between the image nodes, the dummy nodes and the nodes not crossed by the first shortest path are concerned, reference can be made to what stated in case 4.

Bidirectional vertical arcs may be left unchanged in the splitting-node sub-step. Thus, they continue to connect corresponding original image nodes as in previous case 3, while no vertical arc connects corresponding dummy nodes.

In order to introduce the inverted horizontal arcs, the presence of the dummy image nodes has to be taken into account. As in case 3, inverted horizontal arcs are introduced:

a) between the pairs of image nodes crossed by the first shortest path; and b) between the corresponding pairs of image nodes thereof laying in layers labeled by the wavelengths used in the first shortest path; and c) if the first shortest path crosses at least one pair of adjacent nodes having wavelength conversion capability, between the corresponding pair of adjacent image nodes in all the layers.

The inverted arcs have a cost with the same absolute value but the opposite sign of the cost of the respective removed arcs belonging to the first shortest path. Differently from case 3, they are introduced so as to connect with an oriented arc each node crossed by the first shortest path with the dummy of its previous one on the first shortest path, starting from the destination node. Thus, in the example considered, node Z is connected to dummy node D', node D is connected to the dummy node C', node C is connected to the dummy node B'. As source node A was not split, node B is connected to node A.

After the introduction of the inverted horizontal arcs, a modified layered graph is obtained. As in previous cases, equivalently, the step of introducing the inverted horizontal arcs may precede the step of removing the horizontal arcs of the first shortest path and corresponding arcs thereof.

Figure 8F:
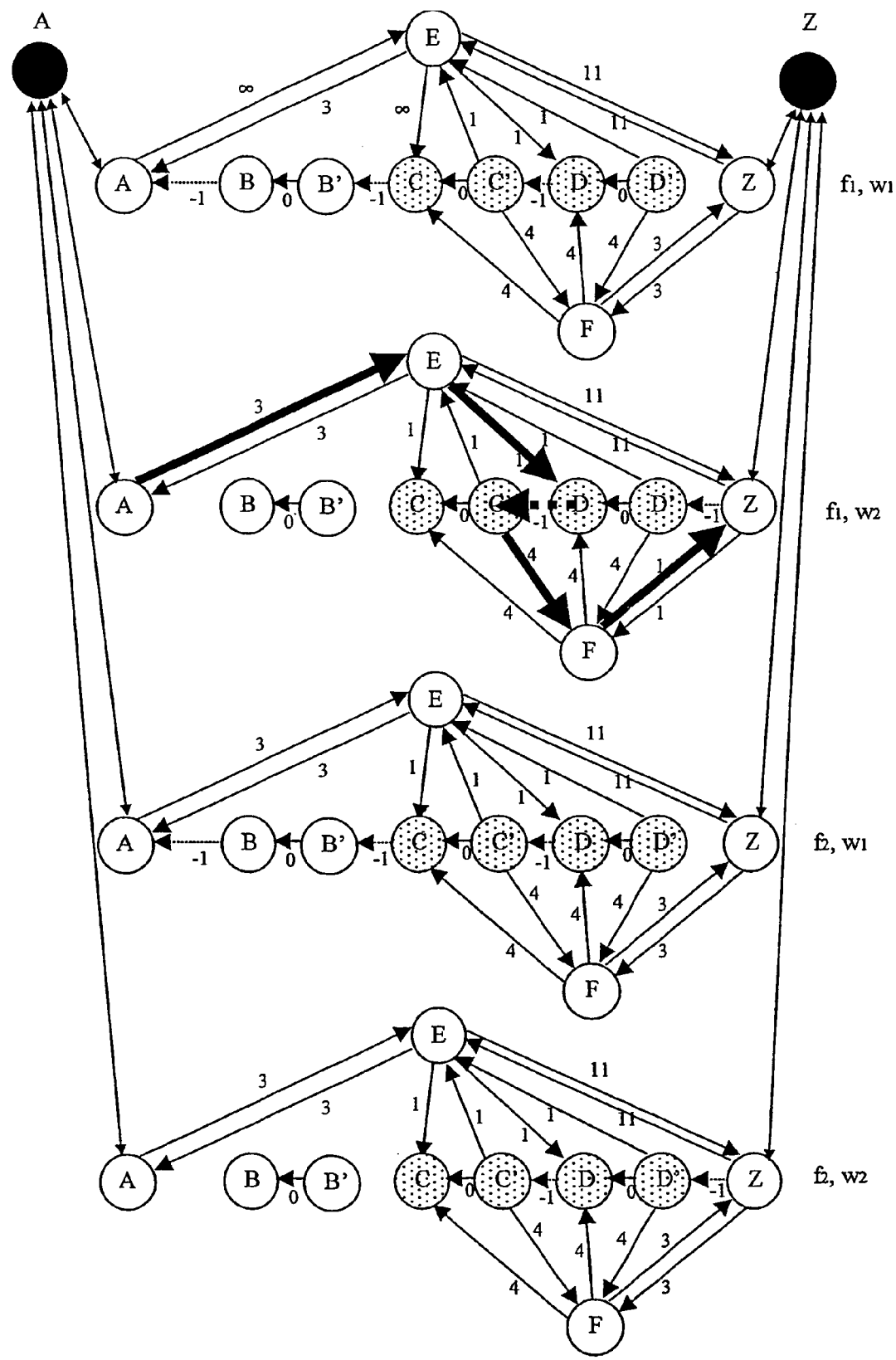

Then, the algorithm proceeds as in case 3, by finding a second shortest path on the modified layered graph. FIG. 8f shows the modified layered graph and the second shortest path. As it can be seen, such second shortest path is similar to that obtained in case 3 (see FIG. 8d), the only difference being in the passage through the dummy node C'.

After the step of finding the second shortest path, the image dummy nodes are coalesced with the original image nodes in all the layers. This coalescing sub-step may be performed in any suitable way, for example by removing the dummy nodes and the arcs having null cost, and by restoring the connections of the other horizontal arcs with the original nodes, or by simply disconnecting the arcs having a cost different from zero connected to the dummy nodes and connecting the same to the original node (thus leaving the arcs having null cost between the dummy nodes and the original nodes).

After the coalescing sub-step, the algorithm proceeds in the same way of case 3, by removing the co-linked horizontal arcs, by restoring the orientation and the cost of the inverted oriented arcs and by building the pair of paths by using the remaining horizontal arcs of the first and of the second shortest path, if necessary by using suitable connecting vertical arcs. For these steps, reference can be made to FIG. 8e. In fact, the edge-disjoint pair of paths found in case 3 is actually also a vertex-disjoint pair.

Dynamic Traffic

Once determined on the layered graph, the pair of disjoint paths has then to be associated to a pair of working-spare lightpaths for implementation in the network of FIG. 5. Such association is accomplished by picking up for each horizontal arc of the pair of paths found a triple comprising the image nodes linked by the arc, the fiber used and the wavelength used. Further informations picked up are related to possible vertical arcs linking corresponding image nodes (meaning fiber switching in the corresponding node of the network), which path will be the working and which will be the spare. In such way, the working and the spare lightpaths can be implemented on the network. The network manager makes available the picked up informations related to the nodes crossed and to the fibers and wavelengths to be used by the working and by the spare lightpath. The network controller, in its turn, uses these informations for providing the configuration of the various OXCs, in order to correctly route the working and the spare lightpaths from the source node A to the destination node Z, that is, in order to allocate the connection request between node A and node Z.

Once a first connection request between a source and a destination node has been allocated, the network manager reviews the costs in the layered graph by assigning an infinite cost to the arcs belonging to the two paths found. Then, a subsequent connection request between a second pair of source-destination nodes can be allocated, if needed, by repeating the algorithm according to the above in the new layered graph.

For any of the above cases 1 to 6, the algorithm for allocation of the single connection request may not be able to find any pair of working-protection lightpaths satisfying the connection request, for example due to lack of a sufficient number of free lighthops. In such case, any change made by the algorithm to the layered graph is undone and the network manager is notified of the block. No allocation is performed by the network controller in this case. Optionally, it may provided that in case of block the algorithm may give the informations suitable for implementing only a working lightpath, with no associated spare.

The steps of the algorithm for allocating a single connection request can be performed by at least one central processing unit (CPU). In particular, the algorithm can be embodied in a software program adapted to be loaded into the memory of a computer comprising the at least one CPU. Such computer can be comprised into the network controller. The software program can be for example embodied in one or more executable files, resident on a suitable support accessible from the memory of the computer, such as a hard disk, a diskette, a CD-ROM or an external disk readable through a LAN. For the purposes of the present invention, the terms "software program adapted to be loaded into the memory of a computer" also comprise files needed for the execution of the executable file or files, such as libraries, initialization files and so on, that can be resident on a suitable support accessible from the memory of the computer, such as a hard disk, a diskette, a CD-ROM or an external disk readable through a LAN. Further, for the purposes of the present invention the terms "software program" also comprise files possibly different from the executable file or files and/or from the files needed for the execution of the same, embodied in an installable software, adapted, when run on the computer, to install the executable file or files and the files needed for the execution of the same. Such installable software can be resident on a suitable support, such as a diskette, or a CD-ROM or it can be available for download from a network resource, such as a server comprised in a LAN or reachable through an external network, for example the Internet.

When a connection request is demanded, the software program, loaded into the memory of the computer, executes the steps of the algorithm for the allocation of the connection request, in order to allocate a pair of working-spare lightpaths to the connection request. More particularly, the network controller may interact with the program, passing informations necessary for assigning the costs of the arcs of the layered graph. The software program, in turn, passes to the network controller the informations necessary for configuring the nodes of the network in order to implement the working-spare lightpath on the network.

Static Traffic

If a static planning of a network has to be performed, the algorithm according to the above can be repeatedly applied in order to allocate all the needed connection requests. Typically, a network topology and a series of connection requests are predetermined, and the problem to be solved is how to minimize a "cost function" (such as for example the actual cost of the network equipment, or the number of fibers to be used, or the total length of the fibers), in the meantime satisfying the demand, and how the nodes of the network have to be configured in order to route the lightpaths for each connection request (both the working and the protection lightpath).

In order to solve this problem, a model representing an oversized network may be used. Initially a maximum number F of fibers per link and a maximum number W of available wavelengths per fiber may be set. The maximum number of wavelengths W may be fixed a priori for the network considered, as it may be known that the links of the network will support a certain number of channels, as for example, 32 or 64 or 128 channels. The maximum number of fibers F should be high enough with respect to the requested traffic demand, but not too high in order to avoid long calculation. The Applicant believes that a value F of several tens of fibers per link can be sufficient for solving the static traffic problem even in complex networks.

However, in this respect, well-known algorithms are capable of giving a minimum number of fibers $F_{min}$, given a network topology and a static traffic matrix. Such minimum number may be used for an estimation of the maximum number of fibers F, for example by setting $F=10\ F_{min}$.

Once the numbers F and W are fixed, the network model is an over-estimation of the real network that will be practically implemented. Then, the algorithm according to the above can be applied repeatedly for each connection request to be allocated. When a connection request is allocated, before the allocation of a new one the costs in the layered graph are revised by assigning an infinite cost to the arcs belonging to the just determined pair of paths. Further, other costs that may depend on the network state (e.g. the load in the various links) may be recalculated. When all the connection requests are satisfied, typically a non-optimized network is found. In this context, "optimization" means minimization of the cost function chosen. In the following, the total number of fibers will be used as exemplary cost function.

As a first optimization, all the fibers not used by any lightpath can be removed from the network. This can be accomplished for example in the layered graph by assigning an infinite cost to all the arcs of the layers labeled by fibers not used by any lightpath. Even in this case, the network may still possibly be non-optimized, as many fibers may be underutilized, that is, may be used by a poor number of lightpaths.

As a second optimization, also the fibers used by a poor number of lightpaths can be removed from the network, if these lightpaths can be routed on other fibers. This second optimization can be performed by an optimization algorithm that scans all the fibers of the network, finds the less used ones, de-allocate the lightpath or lightpaths which use these fibers (both the working and the spare lightpaths), eliminate these fibers and tentatively try to reallocate the removed lightpaths (both the working and the spare) in the network with a lower number of fibers. If the attempt is not successful for some lightpaths, the fibers are left in the network and the de-allocated lightpaths are restored. If the attempt is successful, the fibers are removed from the network. At the end of the optimization process, the number of the fibers used per link is typically much lower than the maximum number F.

Figure 9:
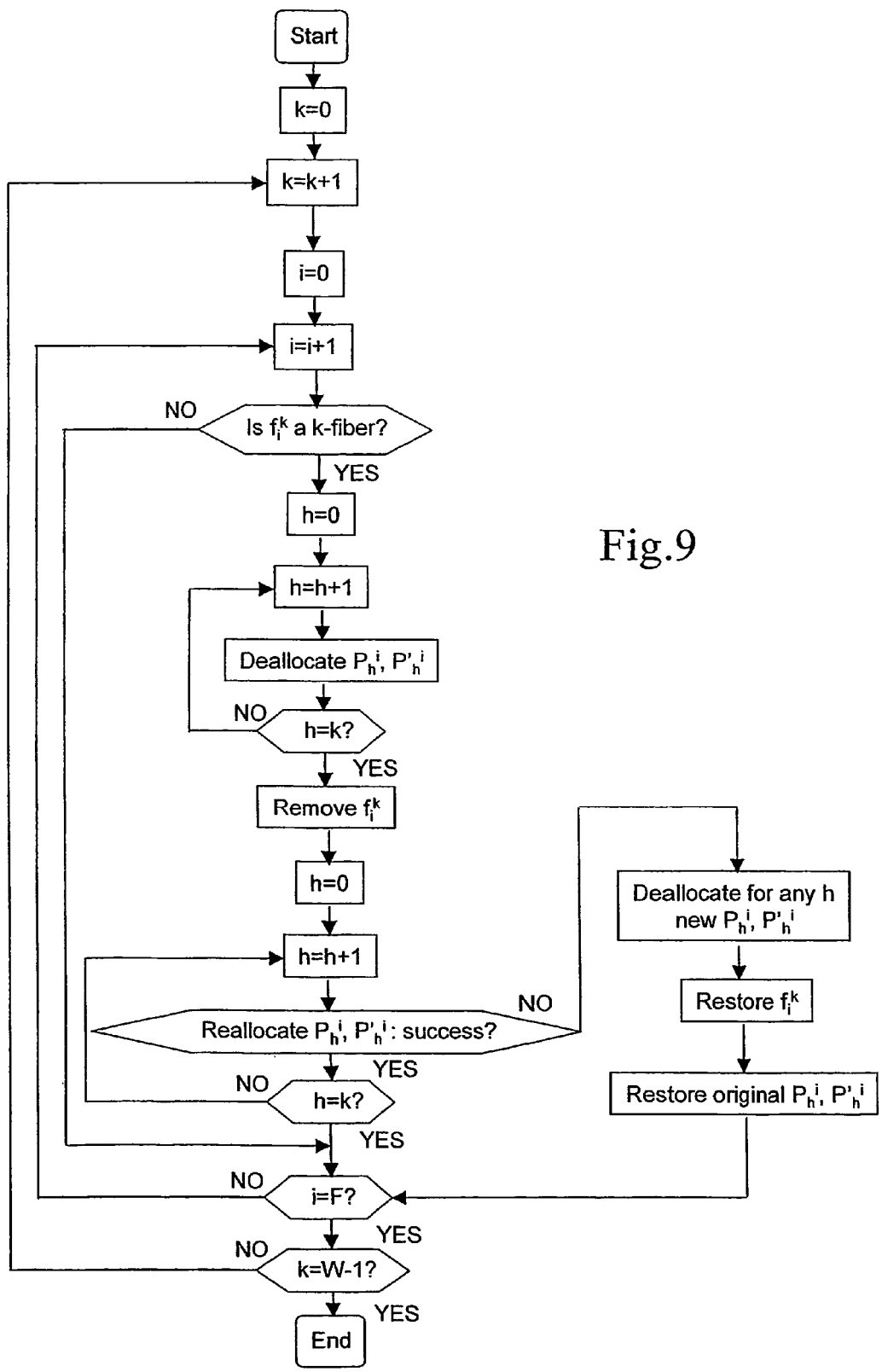
FIG. 9 shows the flow-chart of an exemplary algorithm for minimizing the number of fibers used in the network.

An exemplary preferred optimization algorithm is shown in the flow-chart of FIG. 9. A counter k, initially set to 0, is iteratively incremented up to W−1. All the fibers of the non-optimized network are labeled by a fiber-counter i, initially set to 0. If L is the total number of links of the network, the fiber-counter i runs up to (F×L). Basically, the algorithm identifies the k-fibers, that are fibers used by k lightpaths (either spare or working), and removes them, de-allocating the k lightpaths using those fibers (both the working and the corresponding spare one) and trying to reallocate them in the network having less fibers.

More particularly, for each value of k, the counter i is incremented until a k-fiber $f_i^k$ is found, that is a fiber using k lightpaths. These k lightpaths can be either working or spare lightpaths and correspond to k connection requests. A third counter h is used, running up to k, in order to identify these lightpaths $P_h^i$ and the corresponding spare or working thereof, $P'^i_h$. All the lightpaths $P_h^i$, $P'^i_h$ are de-allocated and the fiber $f_i^k$ is removed. Then, for each h the connection request corresponding to the lightpaths $P_h^i$, $P'^i_h$ is tentatively reallocated on the thus modified network. For the reallocation, the algorithm for the allocation of a single connection request above explained is used, after having assigned an infinite cost to the horizontal arcs corresponding to the fiber $f_i^k$ laying in layers labeled with any wavelength. If the reallocation is successful for any value of h, that is for all the lightpaths, then the iteration of the counter i proceeds in order to find the next k-fiber. If the reallocation is not successful, the k-fiber and the k pairs of lightpaths are restored. When the scan of all the fibers is finished, the counter k is incremented and the scan of the fibers is repeated.

Iterative optimization algorithms such as the one described above can be provided for any chosen cost function.

The optimization algorithm can be embodied in a software program adapted to be loaded into the memory of a computer to be executed in order to perform the needed steps for the allocation of the lightpaths and the optimization of the network. Such program can be embodied in one or more executable files, resident on a suitable support accessible from the memory of the computer, such as a hard disk, a diskette, a CD-ROM, an external disk readable through a LAN. The terms "software program" also comprise files needed for the execution of the executable file or files, such as libraries, initialization files and so on, that can be resident on a suitable support accessible from the memory of the computer, such as a hard disk, a diskette, a CD-ROM, an external disk readable through a LAN. Further, the terms "software program" also comprise files possibly different from the executable file or files and/or from the files needed for the execution of the same, embodied in an installable software, adapted, when run on the computer, to install the executable file or files and the files needed for the execution of the same. Such installable software can be resident on a suitable support, such as a diskette, or a CD-ROM or it can be available for download from a network resource, such as a server comprised in a LAN or reachable through an external network, for example the Internet.

EXAMPLES

The Applicant has realized a software program for solving the static traffic planning problem, implementing the algorithms above described for the allocation of the single connection request and for the optimization of the resulting network. The software program was written in C++ language for running with a UNIX operating system. The Standard Template Libraries of C++ have been used. In particular, static data structures have been used for implementing the network topology, that is the list of the nodes and of the links. Each node has been implemented by dynamic data structures, using pointers for identifying and linking the adjacent nodes. Other variables defined in each node are an identifier and the number of fibers managed by the node. Each link has an identifier and is determined by a pair of nodes, that are the source and the destination of the link. Each link has further dynamic data structures for managing the number of fibers allocated during the dimensioning and optimization of the network. The layered graph has been implemented by a static data structure, called matrix. The elements of the matrix are several pointers, that point to structures defining the image nodes. Each structure defining an image node has a triple identifier (node, fiber, wavelength) and a field defining the arcs (both horizontal and vertical) connecting the image node to the adjacent image nodes, according to the network topology. Other data structures define the connection requests and the paths found. Each structure defining a path has a field for defining the various hops forming the path and a field for classifying the path as working or spare.

When run on a computer, the software program shows on the screen a user interface, by which a user can define the network topology, a list of connection requests, the maximum number of fibers per link, the maximum number of wavelengths per fiber. Further, the user interface allows the choosing of the RFWA criterion for the allocation of the connection requests and the sorting criterion for choosing which connection request has to be allocated first.

Figures 10, 11:
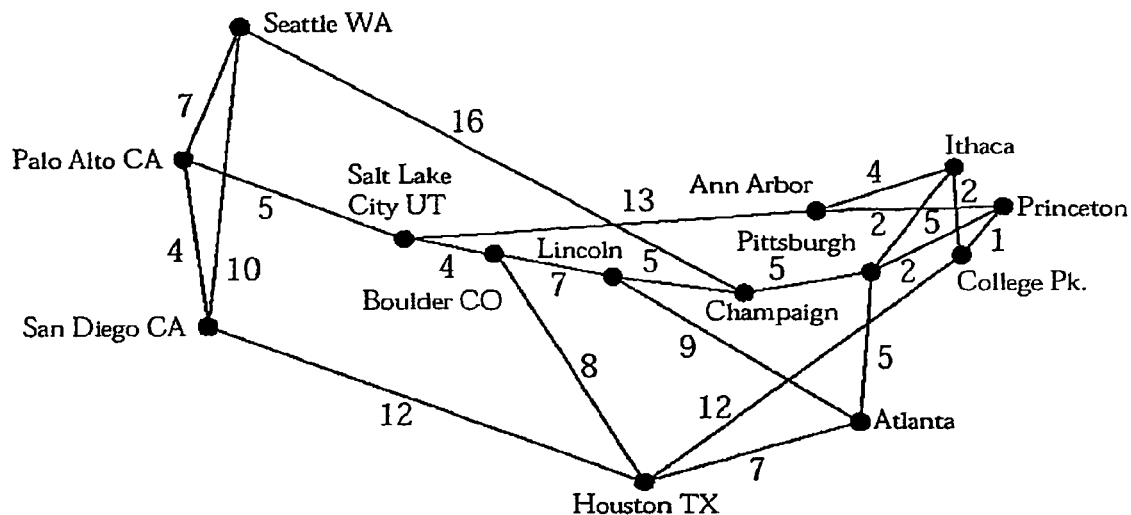
FIG. 10 shows an exemplary mesh network (NFS-Net)
FIG. 11 shows a table comprising a series of connection requests to be allocated on the network of FIG. 10.

The software program has been tested by using a well known network, called NSF-Net (National Science Foundation Network). This network, shown in FIG. 10, is a mesh network extending in the United States, having 14 nodes and 22 bidirectional links, described for example in Y. Miyao, H. Saito, "Optimal Design and Evaluation of Survivable WDM Transport Networks", IEEE Journal on Selected Areas in Communications, vol.16, n.7 (1998). The numbers near each link in FIG. 10 represent a normalized length, in the same way as in the above article. For the test, the 22 bidirectional links have been implemented by 44 monodirectional links. The software program has been used in order to dimension the network, both for WP and VWP cases, according to four different RFWA criteria, allocating the connection requests according to four different sorting criteria, for five different maximum numbers of available wavelengths W per fiber (2, 4, 8, 16, 32) in each link of the network. Thus, 160 network dimensionings have been performed totally.

Edge-disjoint working-spare pairs of paths were allocated for each connection request shown in the table of FIG. 11. The nodes of the NSF-Net have been numbered according to the following: 1—Seattle; 2—Palo Alto; 3—San Diego; 4—Salt Lake City; 5—Boulder; 6—Houston; 7—Lincoln; 8—Champaign; 9—Pittsburgh; 10—Atlanta; 11—Ann Arbor; 12—Ithaca; 13—Princeton; 14—College Pk. The number reported in row i and column j means a connection request from node i to node j and vice versa. Totally, 370 connection requests have to be allocated.

The four RFWA criteria considered were:
minimum hop least loaded routing (mHLLR): the routing minimizes the number of hops and the load (number of channels) of the path;
minimum length least loaded routing (mLLLR): the routing minimizes the length and the load of the path;

minimum hop shortest path (mHSP): the routing minimizes the number of hops;

minimum length shortest path (mLSP): the routing minimizes the length.

The four sorting criteria considered for the connection requests were:

longest first: the connection requests between nodes causing the maximum number of hops are allocated first;

most requested couples first the most requested connection requests are allocated first;

balanced: a parameter is defined for each pair of source-destination nodes, given by the product between the length of the pair of edge-disjoint paths and the number of connection requests not yet allocated;

random: the connection request is chosen randomly.

The parameters considered for the optimization were: the total number of fibers in the network M, the total fiber length in the network L, the saturation factor $\rho$, defined as the ratio between the channels used and the maximum number of channels, that is (W×M).

The results will be shown in plots. The different criteria will be labeled as in the following table 1:

TABLE 1

| Criterion | Label |
|---|---|
| VWP - mHLLR | C1 |
| VWP - mLLLR | C2 |
| VWP - mHSP | C3 |
| VWP - mLSP | C4 |
| WP - mHLLR | C5 |
| WP - mLLLR | C6 |
| WP - mHSP | C7 |
| WP - mLSP | C8 |

Example 1

Figure 12A:
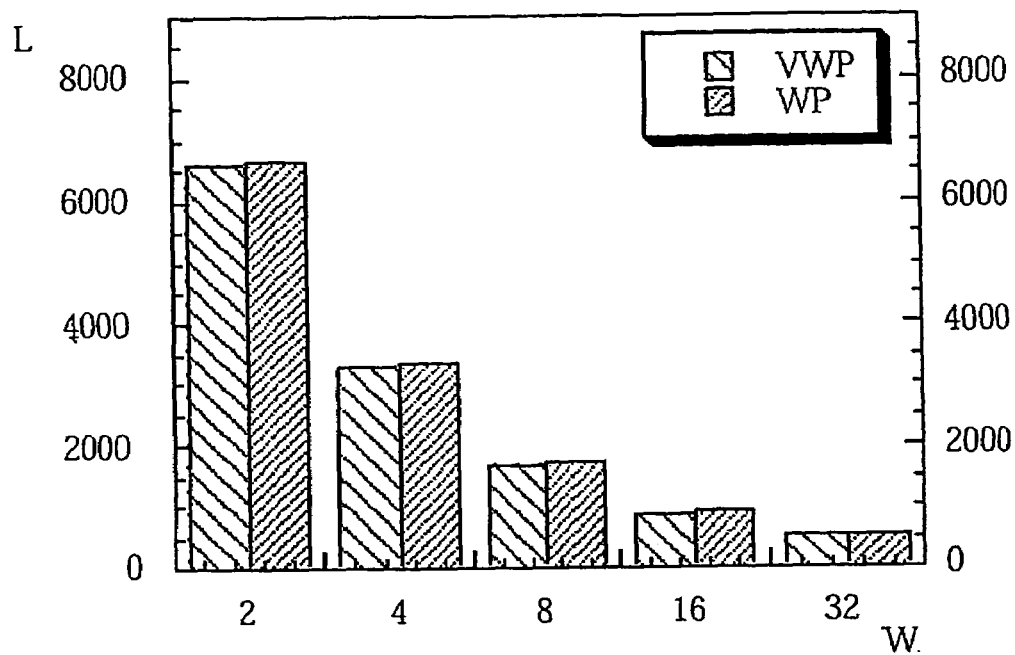
FIGS. 12a-b show the results obtained after allocation of the connection requests of the table of FIG. 11 on the network of FIG. 10, by a tool implementing the adapted algorithm, in terms of total fiber length versus maximum number of wavelengths available on the network.
Figure 12B:
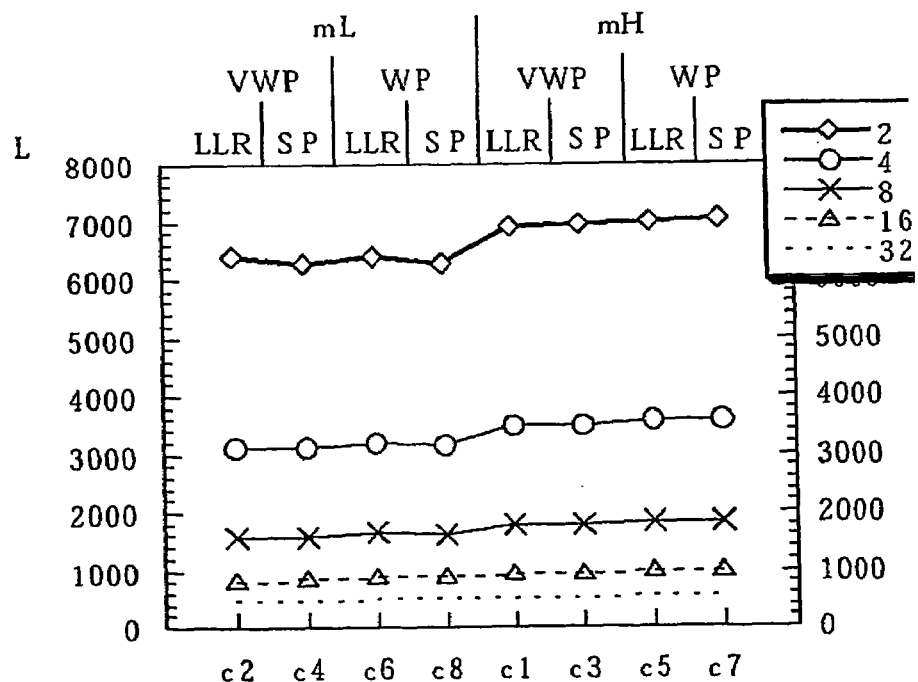

FIG. 12a shows the results obtained for the total fiber normalized length L versus the maximum number of wavelengths W, both for the WP and the VWP cases. The height of each column in FIG. 12a represents the average value of normalized length for all the considered RFWA criteria and connection request sorting criteria. As it can be seen, a slightly lower length L is obtained in the VWP case. FIG. 12b shows the total fiber normalized length versus the chosen RFWA criteria, for the various maximum number of wavelengths W. The points in FIG. 12b represent the average value of normalized length for all the considered connection request sorting criteria. As it can be seen, the best RFWA criteria are the minimum length ones, both for WP and VWP cases: this result could be expected, having chosen the total fiber length as parameter for the optimization.

Example 2

Figure 13A:
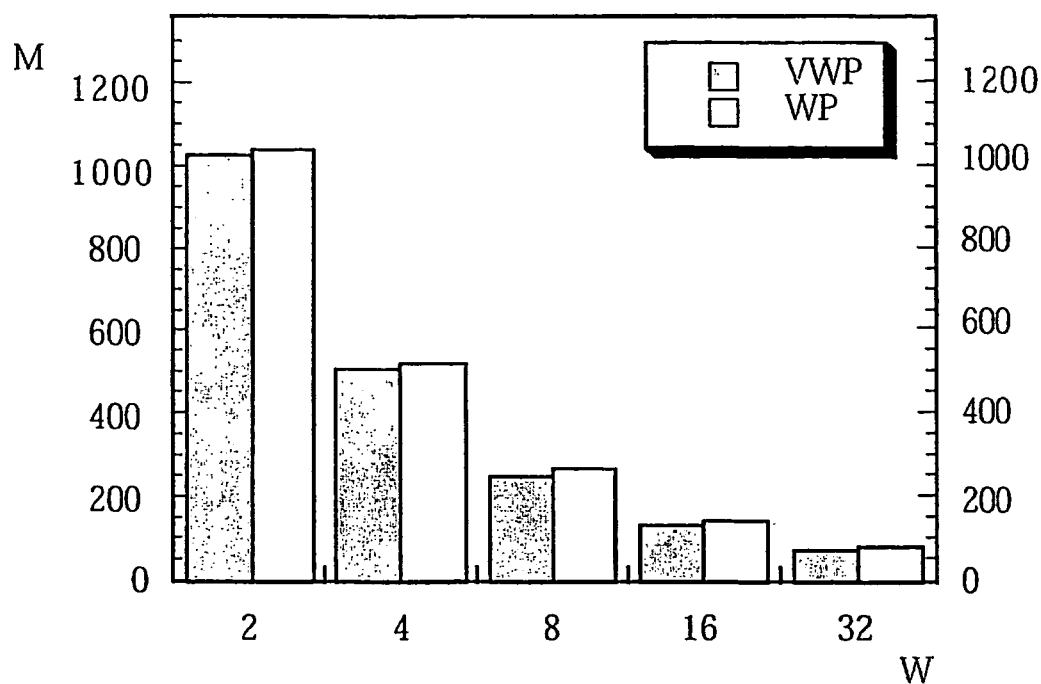
FIGS. 13a-b show the results obtained after allocation of the connection requests of the table of FIG. 11 on the network of FIG. 10, by a tool implementing the adapted algorithm, in terms of total number of fibers versus maximum number of wavelengths available on the network.
Figure 13B:
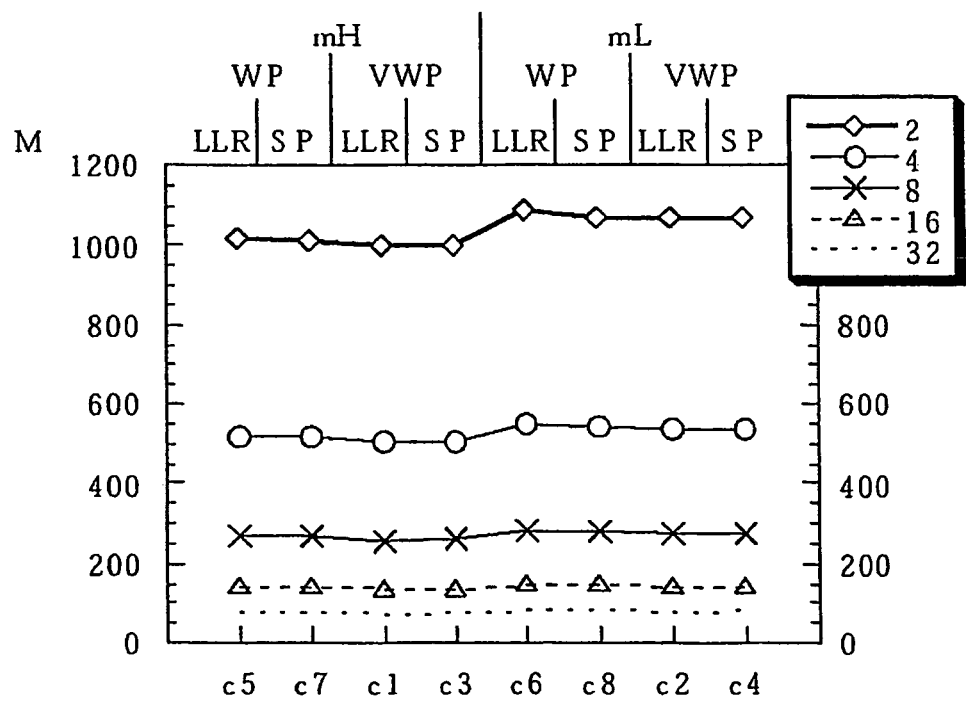

FIG. 13a shows the results obtained for the total number of fibers M versus the maximum number of wavelengths W, both for the WP and the VWP cases. The height of each column in FIG. 13a represents the average value of total number of fibers for all the considered RFWA criteria and connection request sorting criteria. As it can be seen, a slightly lower M is obtained in the VWP case. FIG. 13b shows the total number of fibers M versus the chosen RFWA criteria, for the various maximum number of wavelengths W. The points in FIG. 13b represent the average value of total number of fibers for all the considered connection request sorting criteria. As it can be seen, the best RFWA criteria are in this case the minimum hop ones, both for WP and VWP cases: this result could be expected, having chosen the total number of fibers as parameter for the optimization.

Example 3

Figure 14A:
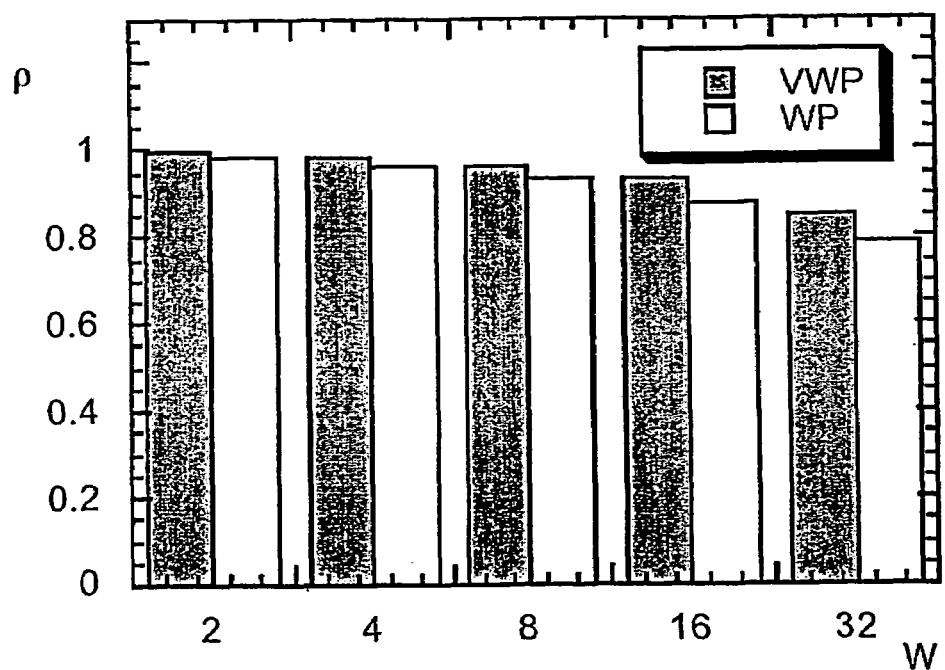
FIGS. 14a-b show the results obtained after allocation of the connection requests of the table of FIG. 11 on the network of FIG. 10, by a tool implementing the adapted algorithm, in terms of saturation factor (defined in the following) versus maximum number of wavelengths available on the network.
Figure 14B:
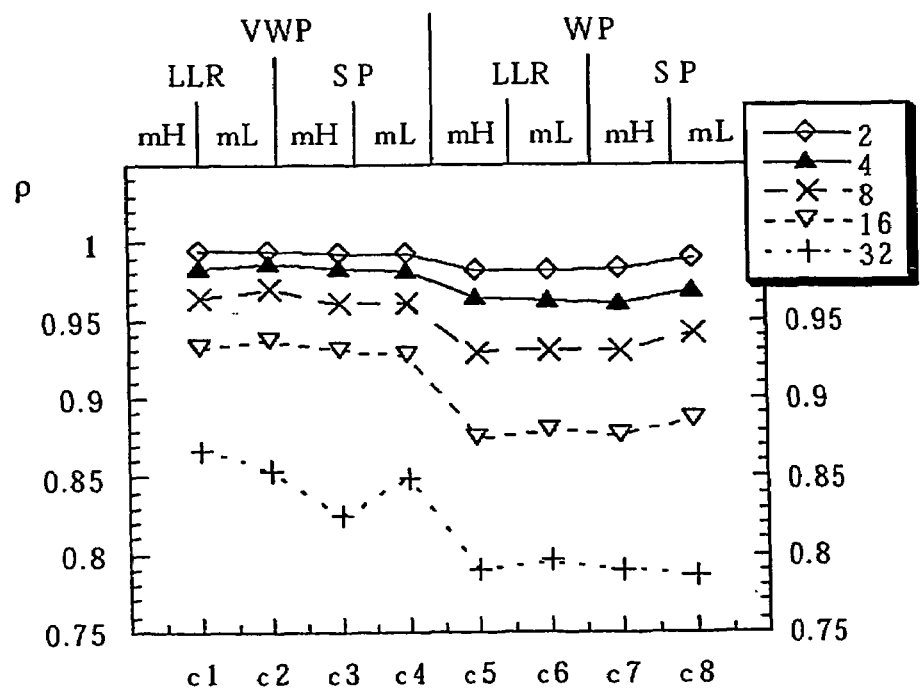

FIG. 14a shows the results obtained for the saturation factor $\rho$ versus the maximum number of wavelengths W, both for the WP and the VWP cases. The height of each column in FIG. 14a represents the average value of saturation factor for all the considered RFWA criteria and connection request sorting criteria. As it can be seen, a slightly higher $\rho$ is obtained in the VWP case. FIG. 14b shows the saturation factor $\rho$ versus the chosen RFWA criteria, for the various maximum number of wavelengths W. The points in FIG. 14b represent the average value of saturation factor for all the considered connection request sorting criteria. As it can be seen, for any RFWA criterion the VWP case allows higher values of $\rho$ with respect to the WP case.

Example 4

Figure 15A:
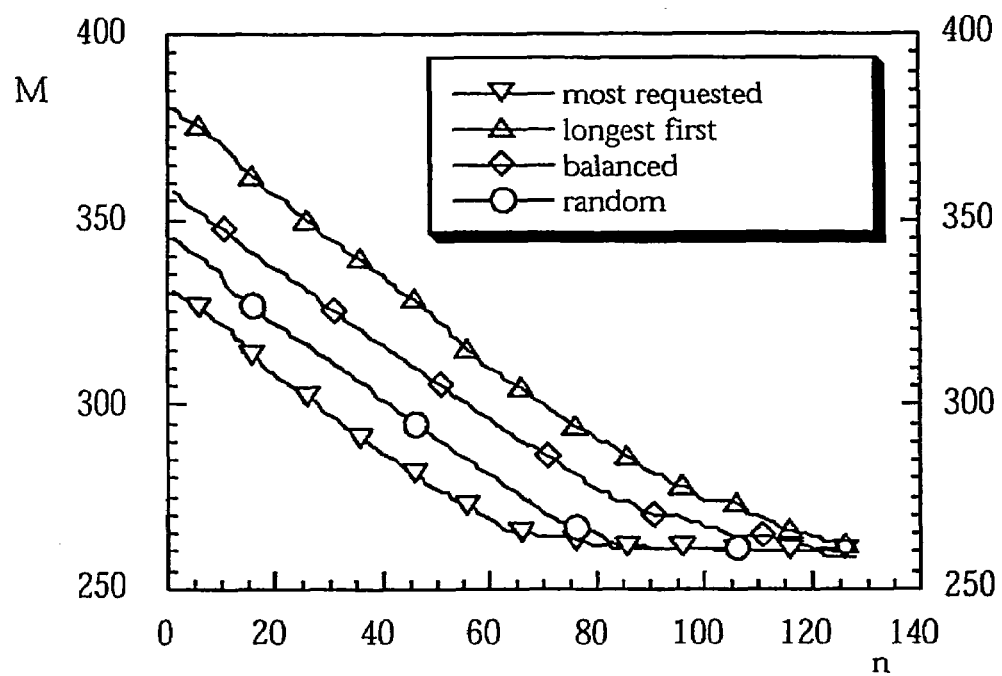
FIGS. 15a-b show the convergence of the exemplary optimization algorithm of FIG. 9, in terms of total number of fibers versus an iteration number n.
Figure 15B:
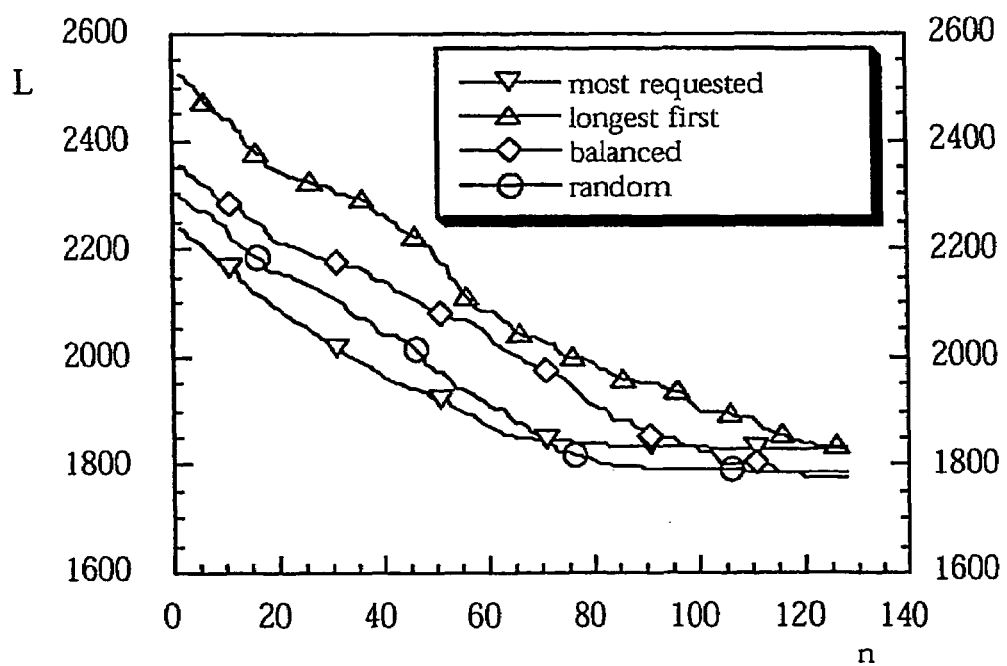

FIGS. 15a and 15b show how the convergence of the optimization algorithm above explained can depend on the sorting criterion chosen for allocating the connection requests. FIG. 15a shows the total number of fibers M versus an iteration number n for the four criteria considered. The iteration number n corresponds to the number of fibers scanned during the optimization algorithm. FIG. 15b shows the total fiber length L versus the iteration number n for the four criteria considered. Both plots were obtained with a maximum number of wavelength W=8. As it can be seen, the optimization converges more rapidly with the most requested couples first and the random criteria.

It will be apparent to one skilled in the art that various modifications and variations may be made to the methods of the present invention without departing from the scope of the invention.

For example, embodiments of a network having the same number of fibers per link, the same number of wavelengths per fiber and the same number of wavelengths for all the links have been disclosed. This has not to be considered as limiting the invention. A different number of fibers per link, or of wavelengths per fiber, or even of wavelengths per link can be taken into account: for example, a layered graph representing an oversized network having the same number of fibers and/or wavelengths can be initially built (using the maximum among the number of fibers and the maximum among the number of wavelengths), then suitably flagging as non-existent (or assigning infinite cost) the arcs representing non-existent hops, due to lack of the corresponding fibers or wavelengths (or both). Such operation can be performed during the assigning of the costs in the layered graph.

As another example, the nodes of the network have been disclosed as having a full capacity of fiber switching or, in case of a node having wavelength converters, a full capacity of wavelength conversion. This has not to be considered as limiting the invention. A less than full capacity of fiber switching and/or wavelength conversion of a node can be taken into account: for example, some or any image nodes in the layered graph may have assigned a multiplicity higher than one, e.g., a counter. The counter should represent the switching capability of the node. When a path determined on the layered graph crosses the node, the counter is decremented. When the counter reaches the value of zero, the node may be flagged as non-available, for example by assigning an infinite cost thereof. The assigning of the counter to the nodes can be comprised in the assigning of the costs to the various elements of the layered graph.

As a further example, the fiber switching and/or wavelength conversion capability of the nodes of the network have been disclosed as fully enabled in the nodes of the network during the lifetime of the network. This has not to be considered as limiting the invention. The disabling of one or more fiber switching and/or wavelength conversion transition through one or more nodes of the network can be taken into account: for example, the corresponding vertical arcs thereof can be disabled in the layered graph, by removing them or assigning an infinite cost thereto.

As a further example, the costs assigned to the various elements of the layered graph have been disclosed as scalar numbers. This has not to be considered as limiting the invention. An array can be assigned to the elements of the layered graph as costs, instead of a single cost. Each number of an array representing a cost may, for example, represent a different RFWA criterion. E.g., the first numbers of each array may represent a Shortest Path criterion, while the second numbers of each array may represent a Least Loaded Routing criterion. For each connection request, the algorithm may find shortest paths in the layered graph by calculating the total cost using first the first numbers of each array, then the second numbers, and so on. At the end of calculation, the shortest of the shortest paths thus determined may, for example, be chosen.

As a further example, the network has been disclosed as always having a number of fibers per link higher than one and always using a number of wavelengths higher than one. This has not to be considered as limiting the invention, as the methods above explained can be used also in the less preferred cases of "monowavelength" networks or in networks including single fiber links or even in networks made of single fiber links.

As a further example, the optical links of the network have been disclosed always in connection with the use of optical fibers for forming the various optical paths. This has not to be considered as limiting the invention. The use of optical paths comprising any other kind of waveguide or even free space in at least one optical link (or even in a portion thereof of the network is contemplated by the present invention.

What is claimed is:

1. A method for allocating a working lightpath and a spare lightpath to a connection request between a source node and a destination node of an optical network, said network comprising a number of nodes interconnected with each other by optical links according to a predetermined network topology, each optical link comprising at least one optical path, said method comprising the steps of:

representing said network with a layered graph comprising a plurality of layers, each layer corresponding to and being labeled by a respective pair optical path-wavelength available in at least a portion of the network, each layer comprising a respective image node for each node of said network and a respective horizontal arc for each link of said network, so as to replicate in each layer said network topology, the layered graph further possibly comprising vertical arcs connecting with each other corresponding image nodes;

assigning a cost at least to each horizontal arc in the layered graph, so as to determine an original layered graph;

determining a first shortest path between an image of said source node and an image of said destination node on the original layered graph, said first shortest path comprising at least horizontal arcs and connecting at least two image nodes;

providing a modified layered graph having:
 a) inverted horizontal arcs in place of the horizontal arcs of the first shortest path and in place of possible corresponding horizontal arcs thereof, such corresponding horizontal arcs connecting, in the original layered graph, image nodes connected by vertical arcs to the image nodes crossed by the first shortest path, each of said inverted horizontal arcs having an orientation and a cost opposite with respect to the orientation and the cost of the respective corresponding horizontal arc of the first shortest path; and
 b) no horizontal arcs in place of possible horizontal arcs corresponding, in the original layered graph, to the horizontal arcs of the first shortest path, such possible horizontal arcs connecting, in the original layered graph, image nodes not connected by vertical arcs to the image nodes crossed by the first shortest path;

determining a second shortest path between an image of said source node and an image of said destination node on the modified layered graph, said second shortest path comprising at least horizontal arcs;

eliminating possible co-linked horizontal arcs of said first and said second shortest path;

connecting the horizontal arcs of said first and said second shortest path remaining after said step of eliminating, so as to build a working path and a spare path between an image of said source node and an image of said destination node; and associating to said working and spare path respectively said working and spare lightpath on said optical network.

2. The method according to claim 1 further comprising, at least after said step of connecting, the steps of;
 a) restoring the original layered graph; and
 b) assigning an infinite cost to the horizontal arcs of said working and spare path.

3. The method according to claim 1, further comprising, before said step of determining a second shortest path, the steps of:

splitting at least the image nodes crossed by said first shortest path and corresponding nodes thereof in all the layers in a pair comprising an original image node and a dummy image node;

connecting said dummy image node to said original image node in each pair of split nodes with a horizontal arc having a null cost oriented from said dummy image node to said original image node;

reorganizing possible connection between image nodes not crossed by the first shortest path, and the corresponding nodes thereof, and said split nodes in all the layers, so that cycles are not formed between said image nodes not crossed by the first shortest path, said original image nodes and said dummy image nodes; and introducing said inverted horizontal arcs so as to connect the image nodes crossed by the first shortest path and corresponding nodes thereof with the dummy image of the respective previous node on the first shortest path or the corresponding dummy image node thereof.

4. The method according to claim 1, wherein said optical network is a Wavelength Path network and said vertical arcs connect with each other corresponding image nodes laying at most to layers labeled with the same wavelength.

5. The method according to claim 1, wherein said optical network is a Virtual Wavelength Path network and said vertical arcs connect with each other corresponding image nodes in all layers.

6. The method according to claim 1, wherein said optical network is a Partial Virtual Wavelength Path network comprising wavelength converters in at least one wavelength conversion node, said vertical arcs connect with each other corresponding image nodes laying in layers labeled with the same wavelength and connect with each other corresponding image nodes of said wavelength conversion node or nodes in all the layers.

7. The method according to claim 1, wherein said step of providing a modified layered graph comprises respectively:
   a) removing the horizontal arcs of the first shortest path from the layered graph and corresponding horizontal arcs thereof in all the layers of the layered graph; and
   b) introducing said inverted horizontal arcs.

8. A method for static traffic planning of a survivable optical network, comprising allocating a plurality of working lightpaths and spare lightpaths to a respective plurality of connection requests, said method comprising the steps of:
   providing a maximum number F of optical paths for each link of said network;
   providing a maximum number W of available wavelengths per optical path; and
   iteratively applying the method of claim 2, until said plurality of said connection requests has been satisfied.

9. The method according to claim 8, further comprising the step of minimizing a predetermined cost function.

10. The method according to claim 9, wherein said step of minimizing comprises the step of removing optical paths not used by neither working nor spare lightpaths.

11. A method for static traffic planning of a survivable optical network, comprising allocating a plurality of working lightpaths and spare lightpaths to a respective plurality of connection requests, said method comprising the steps of:
   providing a maximum number F of optical paths for each link of said network;
   providing a maximum number W of available wavelengths per optical path;
   iteratively applying the method of claim 2, until said plurality of said connection requests has been satisfied;
   minimizing a predetermined cost function by removing optical paths not used by neither working nor spare lightpaths; and
   further comprising the following steps:
   a) providing a first counter k initially set to 1;
   b) identifying k-optical paths using k lightpaths, either working or spare, corresponding to k connection requests;
   c) for each k-optical path, respectively de-allocating said k-lightpaths and the related working or spare lightpaths thereof, removing said k-optical path, tentatively re-allocating the k connection requests related to the k lightpaths by iteratively applying the method of claim 2;
   d) if said step of re-allocating the k connection requests is successful, then repeating step c) for the next k-optical path; else respectively restoring said k-optical path, re-allocating said k lightpaths and repeating step c) for the next k-optical path; and
   e) setting k=k+1 and iteratively applying steps a) to d) up to k=W−1.

12. A reconfigurable optical network comprising a number of nodes interconnected with each other by optical links according to a predetermined network topology further comprising:
   a network controller for configuring said nodes in order to route wavelength channels over optical paths comprised in said optical links according to a plurality of connection requests between pairs of source-destination nodes;
   a network manager being adapted, in case of a new connection request is demanded between a pair of source-destination nodes, to apply the method claimed in any one of claims 1-7, in order to allocate a pair of working-spare lightpaths to the new connection request and adapted to output configuration information for the network controller for configuring nodes involved in said pair of working-spare lightpaths for routing channels over optical paths according to said pair of working-spare lightpaths.

13. A computer readable medium encoded with a computer program product loadable into a memory of a computer, said computer program product being adapted, when run on a computer, to outputting information for a network controller, said network controller being adapted for configuring nodes of an optical network in order to route wavelength channels over optical paths comprised in optical links between said nodes, said computer program product comprising software code portions for performing the steps of any one of claims 1-7, when a new connection between a pair of source-destination nodes is requested.

14. A computer readable medium encoded with a computer program product loadable into a memory of a computer, comprising software code portions for performing the steps of any one of claims 8-11, for static traffic planning of a survivable optical network, said computer program product being adapted, when run on a computer, to outputting information suitable for allocating a plurality of connection requests on said optical network.

15. The computer program product according to claim 14, further comprising software code portions for showing, when such program is run on a computer, a user interface adapted to the inputting of at least one of the following data: topology of the network, maximum number of optical paths, maximum number of wavelengths per optical paths, criterion for associating a cost to each arc of the layered graph.

* * * * *